(12) United States Patent
Yokoya et al.

(10) Patent No.: US 8,589,650 B2
(45) Date of Patent: Nov. 19, 2013

(54) DYNAMICALLY CONFIGURABLE MEMORY SYSTEM

(75) Inventors: Satoshi Yokoya, Nice (FR); Philippe Gentric, La Colle sur Loup (FR); Alain Michel Breton, Saint Paul (FR); Steven Charles Goss, Antibes (FR); Steven Richard Jahnke, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 514 days.

(21) Appl. No.: 12/815,891

(22) Filed: Jun. 15, 2010

(65) Prior Publication Data
US 2011/0283071 A1 Nov. 17, 2011

(30) Foreign Application Priority Data
May 17, 2010 (EP) ..................................... 10290260

(51) Int. Cl.
*G06F 12/02* (2006.01)
(52) U.S. Cl.
USPC ................................... 711/165; 711/E12.002
(58) Field of Classification Search
None
See application file for complete search history.

(56) References Cited

U.S. PATENT DOCUMENTS

2005/0232192 A1* 10/2005 Rawson, III .................. 370/329
2010/0191929 A1* 7/2010 Rawson, III .................. 711/170

* cited by examiner

*Primary Examiner* — Charles Rones
*Assistant Examiner* — Ryan Dare
(74) *Attorney, Agent, or Firm* — Alan A. R. Cooper; W. James Brady, III; Frederick J. Telecky, Jr.

(57) ABSTRACT

In a digital system with a processor coupled to a paged memory system, the memory system may be dynamically configured using a memory compaction manager in order to allow portions of the memory to be placed in a low power mode. As applications are executed by the processor, program instructions are copied from a non-volatile memory coupled to the processor into pages of the paged memory system under control of an operating system. Pages in the paged memory system that are not being used by the processor are periodically identified. The paged memory system is compacted by copying pages that are being used by the processor from a second region of the paged memory into a first region of the paged memory. The second region may be placed in a low power mode when it contains no pages that are being used by the processor.

21 Claims, 18 Drawing Sheets

DYNAMICALLY CONFIGURABLE MEMORY SYSTEM

CLAIM OF PRIORITY UNDER 35 U.S.C. 119(a)

The present application claims priority to and incorporates by reference European Application number 10290260.8, filed May 17, 2010 entitled "Dynamically configurable Memory System."

FIELD OF THE INVENTION

This invention generally relates to power conservation within a digital computing system.

BACKGROUND OF THE INVENTION

Mobile computing devices are a ubiquitous fixture of modern society. Cellular telephones, personal music players, portable gaming systems, etc. are constant companions for many people. Cell phones continue to increase in computer processing capability and sophistication. The increased memory capacity and computing resources on a cell phone support the installation of various applications, often referred to as "apps" that allow a diverse range of functions to be performed by the cell phone when not being used for conversation.

A typical mobile computing device, such as a cellular handset, typically incorporates an operating system such as; "Linux", "Window Mobile" or "Symbian". These operating systems are widely available in the industry and fairly standard.

A mobile computing device should work at least one day without re-charging. They are often in stand-by mode, left in a purse or pocket during the transportation. However, the user does not want to turn off the device, since they want to use the device from time to time. The device needs to be ready immediately if needed.

In the past, the functionality of the mobile computing device was limited so that the device could be designed to operate at low power. In some devices, the battery could last several days between charging.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Figure 1:
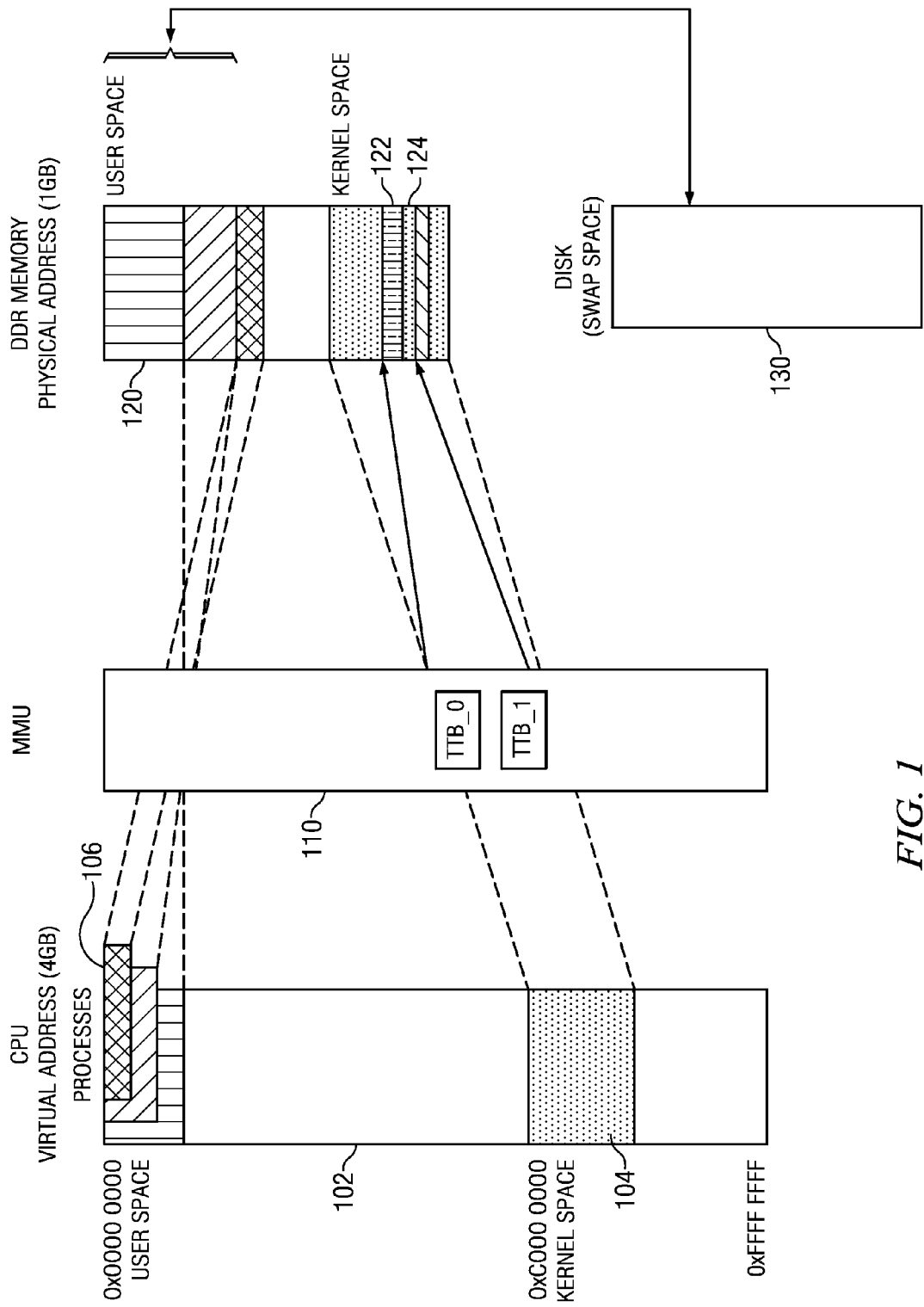
FIG. 1 is a schematic diagram illustrating a memory mapping scheme in an exemplary embodiment of the invention.

Specific embodiments of the invention will now be described in detail with reference to the accompanying figures. Like elements in the various figures are denoted by like reference numerals for consistency. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Embodiments of the invention will be described for a mobile computing device, such as a mobile handset for the cellular telephone network. However, embodiments of the invention are not limited to mobile handsets and may be applied to a number of computing platforms for reducing power consumption.

A mobile computing device may have one central processing unit (CPU), or there may be several processing nodes that operate in multiprocessor fashion. However, as processor performance has increased and power efficiency has also improved, it has now become desirable for a mobile computing device to run personal computer (PC) like applications. For such a purpose, it may be necessary to use large memory configurations that are similar to PC memories. Such a memory system may include virtual memory address to physical memory address translation using a memory management unit (MMU) that typically relies on dividing the memory into pages. As will be described in more detail below, embodiments of the present invention allow placing a portion of the memory system in a low power mode in order to conserve power usage and extend battery life.

In one embodiment of the invention, the memory of a mobile computing device becomes dynamically and autonomously configurable. Such changes are processed automatically in the background. Self refresh power of the DDR memory is optimized automatically according to the system memory usage. In addition, by adding a small low power memory, further reduction of the standby power is possible.

Embodiments of the invention may be provided without modifying the operating system itself.

Usually the operating system needs to work with the fixed physical memory space. Once the operating system has been booted, it is generally not possible to change the physical memory. The physical memory pages are frequently allocated, freed, and swapped by the execution of the operating system. As a result of the execution of various applications over a period of time, the pages are fragmented into the small blocks and spread over the physical address space. It is normally not possible to switch off a part of the memory, or change the bank arrays that are being self-refreshed.

The memory dominates the power consumption of the mobile computing system when it is in standby or executing low intensity back ground applications. In order to extend battery life, it is desirable to reduce the memory usage when the device is in a standby mode, or running low intensity applications. The large memory is not required for keeping the system in standby mode, or for low intensity applications such as a music player application (app). However, with currently available operating systems, if the available memory size is changed, the operating system must be re-booted.

FIG. 1 illustrates an example of virtual memory mapping in an embodiment of the invention that uses the Linux operating system (OS) and the ARMv6 CPU architecture. The ARM is a 32-bit reduced instruction set computer (RISC) instruction set architecture (ISA) developed by ARM Holdings. It is also known as the Advanced RISC Machine. Due to the relative simplicity of the ARM RISC processors, they are popular for use in battery powered mobile computing systems. While this embodiment is described with regard to the ARMv6 and Linux, it is to be understood that embodiments of the invention are not restricted to the ARM family of processors or to the Linux OS and may be embodied using a variety of processors and operating systems in which memory mapping is used. A detailed description of the ARMv6 and Linux will not be included here since they are well known.

The Linux Kernel and the device drivers are mapped in a Kernel space 104. It is a privileged address space located above 3 GB in a 4 GB virtual address space 102 of the ARM processor; this space is not allowed to be accessed from the user processes, indicated generally at 106. Kernel space is flat address and not dynamically paged as the user space. In the ARMv6 architecture, Translation Table Base 1 (TTB1) is used for converting the Kernel space to the desired physical address, which gives some flexibility to the chipset design.

Each user process 106 addresses the linear address space of 4 GB, and each of the multiple processes will be executed under control of the operating system. Therefore, their addresses need to be translated to the individual physical address spaces before accessing to the external memory.

A Memory Management Unit 110 is used to translate the virtual address (VA) to physical address (PA). Virtual to Physical address translation is accomplished by a paging mechanism with a granularity of a page by pointing at a lookup page-table. In the ARMv6 architecture, it is possible to choose between various page sizes; (1 KB, 4 KB, 16 KB, and 64 KB) or sections (1 MB, and 16 MB).

Physical memory 120 is typically smaller than 4 GB, depending on the system needs. Physical memory 120 may be implemented using volatile memory, such as dynamic random access memory (DRAM), synchronous DRAM (SDRAM), single data rate (SDR) SDRAM, dual data rate (DDR) SDRAM, low power DDR (LPDDR, LPDDR2), or other types of known or later developed volatile or non-volatile memory. In some embodiments of the invention, a portion of the physical memory may be implemented using a lower power device than another portion of the physical memory, as will be described in more detail later.

Page table_0 122 is located in physical memory 120 and is pointed to by translation table base_0 (TTB_0) and is used to translate user space addresses. There is an address base entry on each page. Page table_1 124 is also located in physical memory 120 and is pointed to by translation table base_1 (TTB_1) and is used to translate kernel space addresses. The address base is fixed.

When a process 106 needs to access a larger address space than the physical memory, a memory swap may take place between the physical memory and a swap space 130. Swap space 130 may be embodied as a physical disk, semiconductor non-volatile memory such as read only memory, phase change memory (PCM), flash memory, etc., or another type of non-volatile memory that is now known or later developed.

When an OS is looking for RAM space, it can take a page in RAM and remove it. (In OS parlance the page is "evicted"). When doing that the OS must determine if the page is read only (e.g. code or data, file), if so it can just reclaim it. If the page is writable, it must be backed-up first. For example, if the page is a file chunk and if the file is open and read only, the page is reclaimed. If the file is open in write mode, the actual file in storage is updated before reclaiming the page; this is called flushing the file cache. In a ram file cache, this is very common. The default Linux desktop behavior is to always use 100% of the RAM, whatever RAM is not used by applications or OS is allocated as file cache to speed up disk access. If the page is application data, then the page is saved in swap space 130 in an area allocated for exactly this purpose: temporary storage of so called "evicted" pages i.e. pages that the OS decides to evict. Algorithms used by OS to choose which pages to evict can be sophisticated: "least recently used" is commonly used. Typically, the OS will reclaim first the RAM allocated by an application that has been idle a long time.

Figure 2:
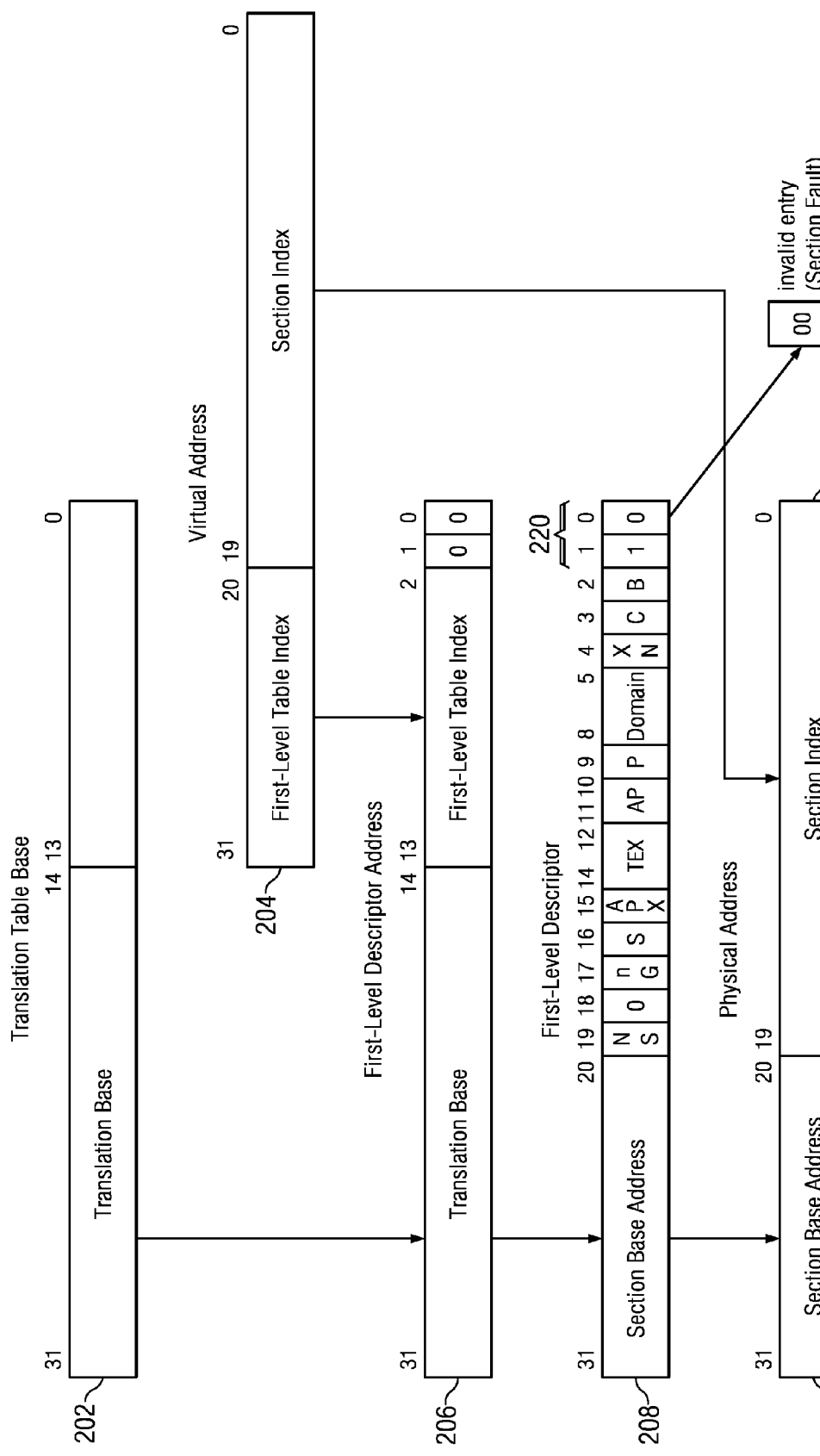
FIG. 2 is a schematic diagram illustrating prior art address translation by a memory management unit (MMU) that has 1 Mb pages.

FIG. 2 illustrates how the MMU translates VA into PA. VA is translated to PA by using a page table, which is also located in the physical memory. FIG. 2 illustrates the case of translating 1 MB sections. The 4 GB VA space is divided into 4096 1 MB sections. VA and PA are identical within 1 MB section boundary, e.g. VA bit (19-0)=PA bit (19-0), which is called section index. The upper 12 bit address is translated by the MMU based on the page table.

TTB_0 register 202 defines the starting address of page table 126 in the physical memory 120 and the page table is indexed by the virtual address 204 that is produced by the ARM CPU. In other words, the page table includes rows of first level descriptors 206 located at the address defined by bits (31-14) of TTB_0 and bits (31-20) of the virtual address.

The first level descriptor indicates the section base address, secure non secure bit, access permission, cacheable/non-cacheable, and page table entry type. A page table entry type field 220 indicates the status of the entry. "10" indicate this is the 1 MB section, "00" indicates section fault and means this is an invalid entry, and "01" points to a second level descriptor for the pages. A physical address is formed by concatenating a section base address bit (31-20) 210 from the first level descriptor entry with a section index 212 from the virtual address bits (19-0).

Figure 3:
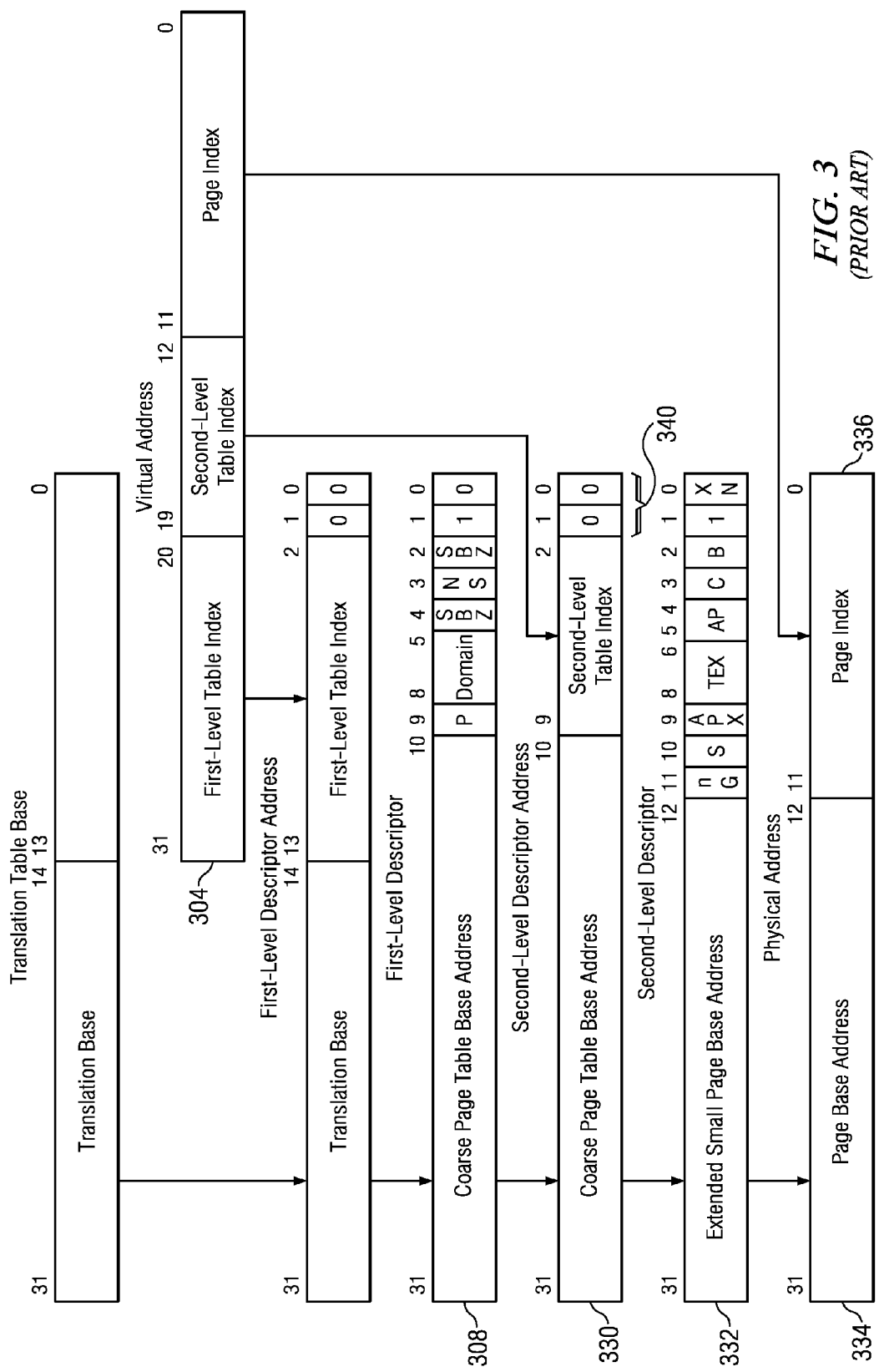
FIG. 3 is a schematic diagram illustrating an extended prior art translation format for 4 Kb pages.

FIG. 3 is a schematic diagram illustrating an extended translation format for 4 Kb pages. For translating pages, two level translations are performed by the MMU. As mentioned before, other page sizes may also be supported. The first level descriptor 308 and VA bits (19-12) point a second level descriptor address 330. The 1 MB sections are now divided into the 256 4 KB pages. The physical address is generated by concatenating page base address 334 bits (31-12) of the second level descriptor and page index 336 bits (11-0) of the VA. If page status 340 bits (1-0) of the second level descriptor are "00", then a translation fault is generated.

When a process is terminated the pages used by the process are no longer needed; the operating system invalidates the page table entry by writing "00" to page status 340 bits (1-0) of the second level descriptor.

If the operating system detects a shortage of the physical memory, the operating system moves selected pages to the disk to increase the free space in the physical memory, referred to as "page out." Typically, the least recently used pages are paged out, but other algorithms for selecting pages to page out may be used. The operating system invalidates the page table entry of the selected pages.

If a process accesses a page that has been paged out, the MMU returns "translation fault" to CPU. The OS suspends the execution of that process and searches the disc to move the page back to the physical memory before resuming the process. This is referred to as "page swap" or "page in." In the meantime, another process may be scheduled.

By using the virtual memory system, it is possible for an application designer to develop a software application independently from other applications that may be used in the same operating system. It is also possible for the application designer to use a larger memory space than the physical memory. However, if the physical memory is too small for the virtual memory needed by the application, page swaps occur too frequently and system performance is degraded.

Therefore the size of the physical memory should be determined by considering the most intensive applications that could be used in the system. In fact, the size of the physical memory is an important parameter to indicate the system performance.

Having a large memory is not a problem for an office computer, but in case of the mobile computing device, it implies short battery life, or a large battery. Embodiments of the present invention allow the size of active physical memory to be adjusted from time to time, based on the demands of the applications without rebooting the system. When a large application is executed, larger physical memory size is allocated to avoid excessive page swaps, and when the OS is in idle, or only low intensity background applications are executed, physical memory size is reduced automatically, as will now be described in more detail.

There are several ways to embody the invention. In a first embodiment, a feature of ARM known as Trustzone is used; this is considered to be a secure way of implementation. In another embodiment, a software hypervisor may be used that provides a reasonably secure environment. In another embodiment, a hardware coprocessor or the companion CPU is added to implement the invention.

Depending on the embodiment, modification to the operating system is not necessary or relatively minor.

An address decoder is attached to the memory controller. It is used to detect the maximum address issued by the system and the value is stored in an Address Space Register (ASR). Configuration of the physical memory size is performed when OS is idle or during an interval of low intensity tasks. Execution of the operating system is suspended, and a Memory Compacting Manager (MCM) is activated. The MCM accesses the page table that is updated by the operating system, replaces the invalid page entry with the valid entry, and creates a large data block in the physical address space. It also programs a smart direct memory access (DMA) engine and moves the pages so that the new page entry matches the page location. Finally it returns the "maximum address space" used in the memory and the value is used to update the ASR.

The Memory Compacting Manager finishes and returns to the operating system execution. A power management routine can use the ASR value to determine which memory bank should be refreshed, or if a high power memory system should be switched on or off.

System standby power may be optimized by utilizing Partial Array Self Refresh that is supported by the multiple JEDEC standards. It is also possible to use both a low power and a high power memory system, and dynamically switch on and off the high power memory system.

First Embodiment

Due to the nature of the MCM, it should be protected by a high security measure. If it is accessible from the non-secure world, it is very easy for a malicious or errant program to destroy the system. Therefore, an exemplary embodiment using ARM Trustzone will be described. However, other embodiments of the invention may use other known or later developed mechanism to provide secure operation of the MCM. It is also possible to integrate the functionality into the kernel of the operating system instead of using Trustzone.

Figure 4:
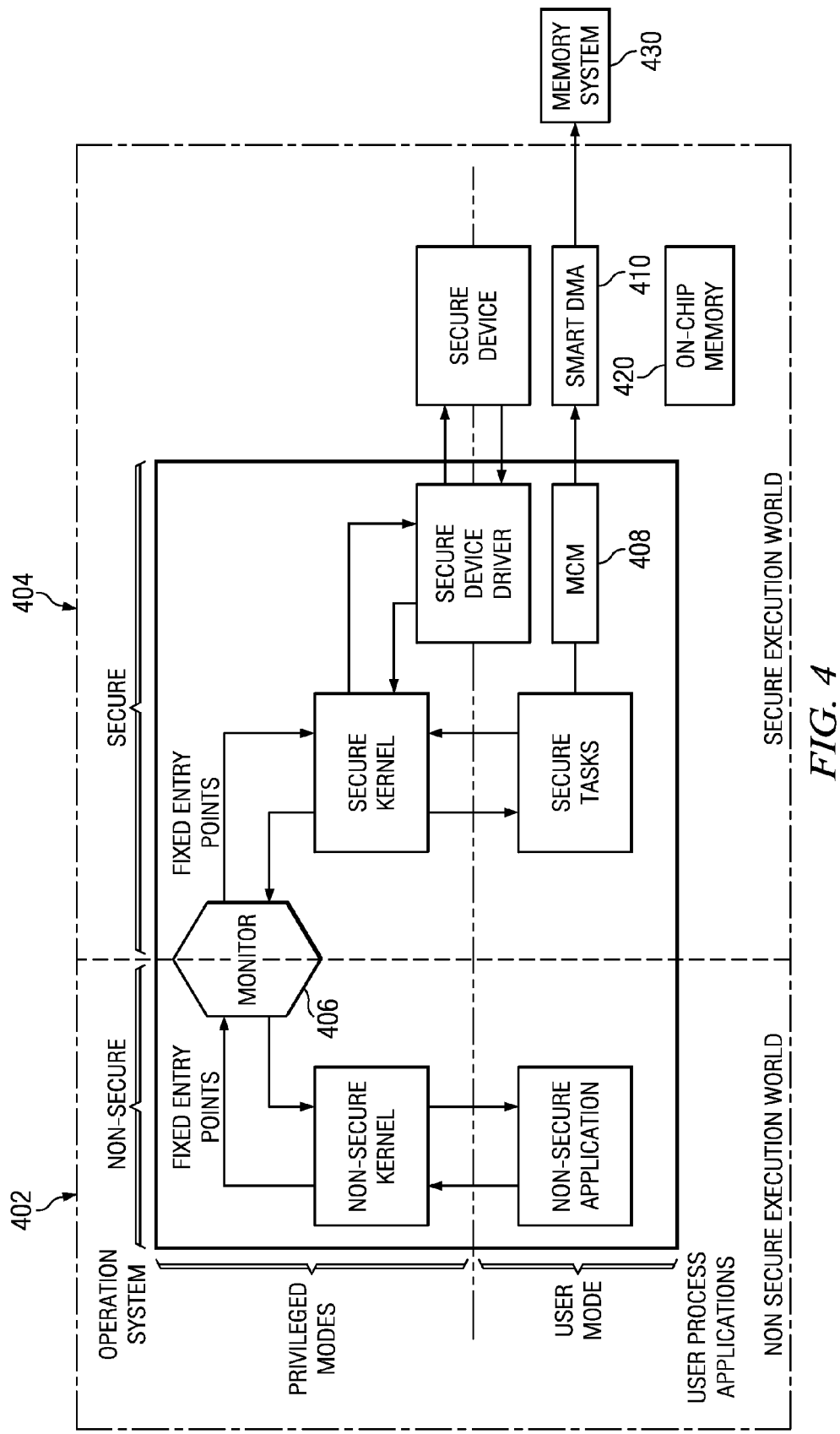
FIG. 4 is a state diagram illustrating a secure memory compacting manager that operates in a trust zone of a mobile computing device.

FIG. 4 is a state diagram illustrating a secure memory compacting manager that operates in a trust zone of a mobile computing device. ARM Trust zone is a kind of virtual machine that has two execution domains in one CPU. A non-secure execution domain 402 is used for executing the operating system and user applications. A secure executing domain 404 is used for the high security applications such as security key handling. There is only one entry point between the secure and the non-secure execution domain, which is monitor mode 406. This structure prevents any undesired program entering to the secure execution domain.

MCM 408 is located in secure execution domain 404. Smart DMA 410 is controlled by MCM 408 to compact memory pages in memory system 430.

Figure 5:
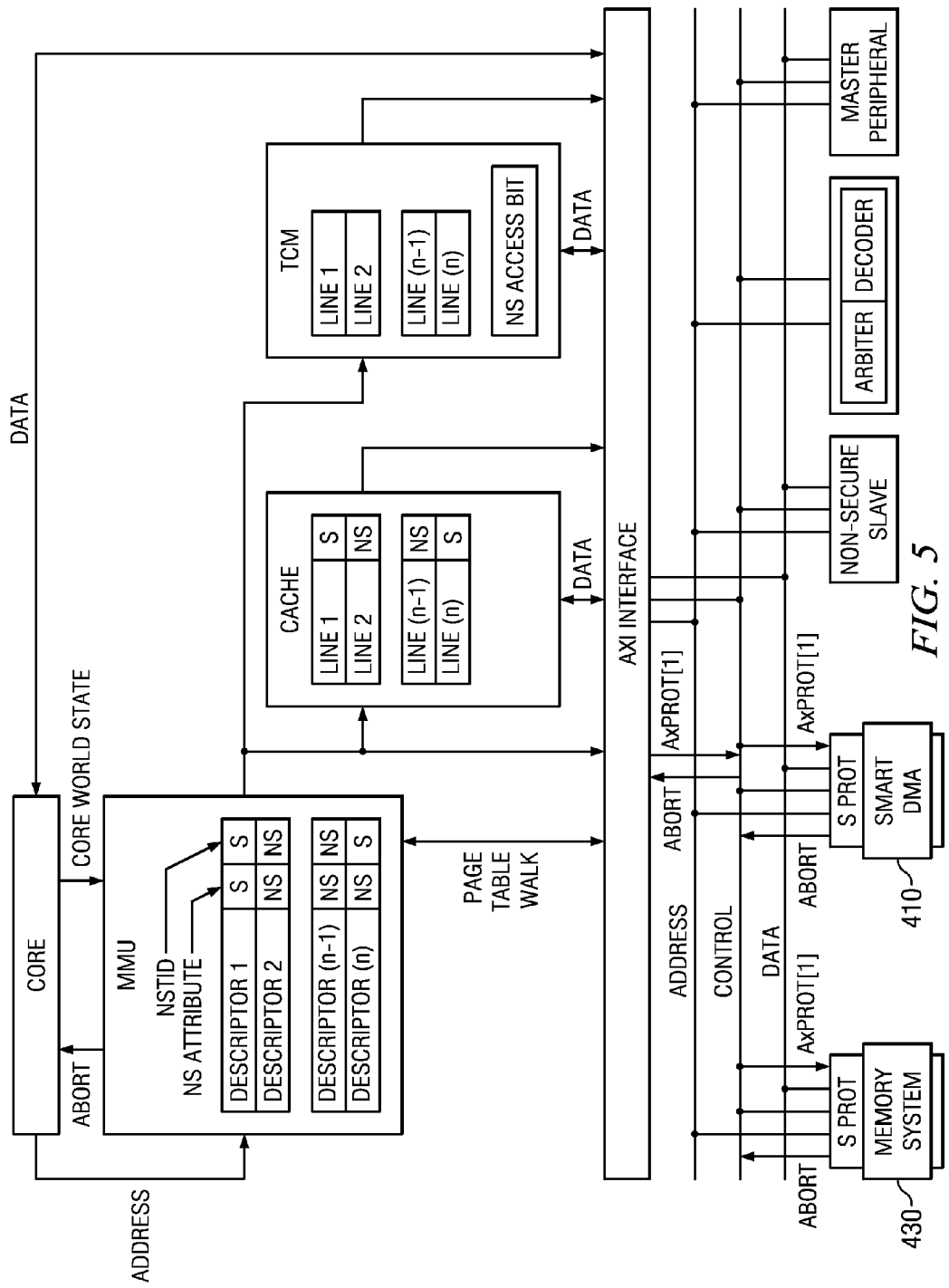
FIG. 5 is a block diagram illustrating a mobile computing device with memory in secure and non-secure regions.

FIG. 5 is a block diagram illustrating a Trustzone in a mobile computing device with memory in secure and non-secure regions. The MMU and the caches have a control bit S (secure), NS (non-secure) that represents the entry of the execution domain, and prevents an access to the secure region from a non-secure region. The on-chip interconnects may be designed to give an access permission to the peripherals. MCM 408 and smart DMA 410 are accessible only from secure execution domain 404, and use secure on chip ROM and RAM.

Figure 6:
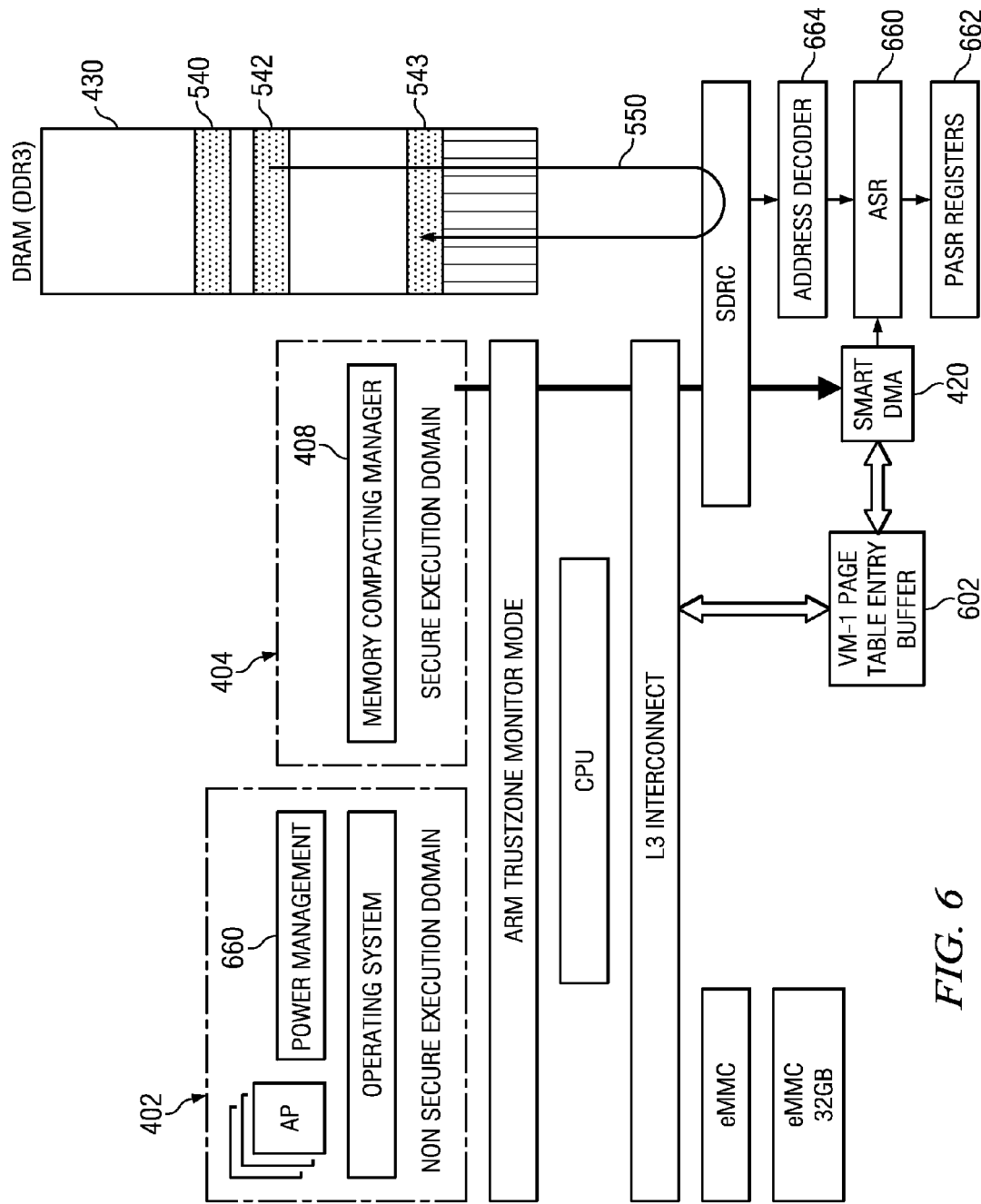
FIG. 6 is a schematic diagram illustrating dynamic memory and power management in the device of FIG. 5.

FIG. 6 is a schematic diagram illustrating dynamic memory and power management in the device of FIG. 5. The operating system is running in non-secure execution domain 402 of the Trustzone. MCM 408 is running in secure execution domain 404 of the Trustzone. Pages 540, 542 are representative of physical pages that are scattered throughout memory system 430. As described above, when the OS determines that a page is no longer being used in a first region of memory system 430 it is marked invalid in page table entry buffer 602. Periodically, MCM 408 scans the page table and reassigns selected valid pages in a second region of memory system 430 to the first region of memory system 430. MCM 408 then programs smart DMA 410 to transfer the selected pages from the second region the first region to the in order to compact the paged memory system.

For example, valid pages 542, 544 are selected for compacting. Smart DMA 410 is shown transferring 550 valid page 542 to a new page location 543. Selected page 544 will then likewise be transferred.

Figure 7:
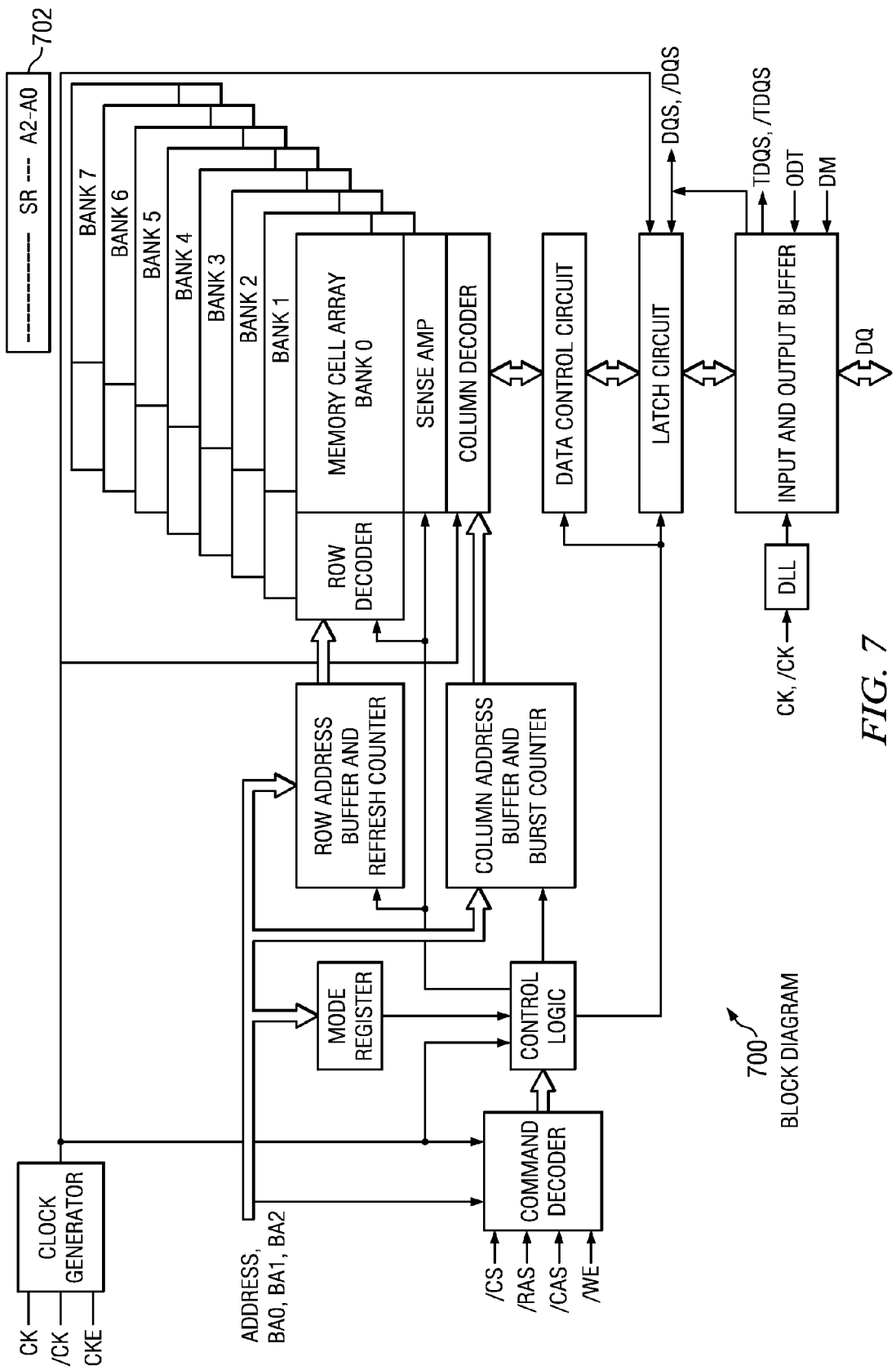
FIG. 7 is a block diagram illustrating DDR3 memory used in the device of FIG. 6.

FIG. 7 is a block diagram illustrating a 2 gbyte DDR3 DRAM module 700 used in memory system 430. In this embodiment, the DRAM is partitioned into 4 or 8 memory banks internally. The banks can be selected by the bank address (BA0-2). When the memory is placed in self refresh mode by setting a self refresh (SR) mode bit in mode register 702 (MR2), three bits of mode register 702 (bits A2-A0) are used to set Partial Array Self Refresh (PASR) register 662, see FIG. 6. In PASR mode, self refresh operation is applied to the selected banks only; e.g. full bank, half ¾, quarter and ⅛. Table 1 shows various PASR options supported by the mode register. Table 2 shows typical power dissipation for one DDR3 DRAM chip for various self refresh modes. As can be seen in Table 2, a significant reduction in power may occur by refreshing only a portion of the memory chip.

TABLE 1

Self Refresh mode options

| A2 | A1 | A0 | Refresh array | |
|---|---|---|---|---|
| 0 | 0 | 0 | Full | |
| 0 | 0 | 1 | Half, banks 0-3 | BA(2-0) = 000, 001, 010, 011 |
| 0 | 1 | 0 | Quarter, banks 0-1 | BA(2-0) = 000, 001 |
| 0 | 1 | 1 | ⅛, bank 0 | BA(2-0) = 000 |
| 1 | 0 | 0 | ¾, banks 2-7 | BA(2-0) = 010, 011, 100, 101, 110, 111 |
| 1 | 0 | 1 | Half, banks 4-7 | BA(2-0) = 100, 101, 110, 111 |
| 1 | 1 | 0 | Quarter, banks 6-7 | BA(2-0) = 110, 111 |
| 1 | 1 | 1 | ⅛, bank 7 | BA(2-0) = 111 |

TABLE 2 examples of power dissipation for different self-refresh modes

| | PASR | Power |
|---|---|---|
| ⅛ | 111 | 49.2 mW |
| ¼ | 110 | 54.0 mW |
| ½ | 101 | 64.8 mW |
| ¾ | 100 | 75.6 mW |
| full | 000 | 86.4 mW |

Referring again to FIG. 6, power management (PM) routine 660 starts when the operating system completes all tasks on a task queue and goes to idle. The PM is responsible for minimizing the power consumption of the system. When the OS is in idle, it turns the DRAM into self refresh, and sets the CPU in the deep sleep mode. (Wait for Interrupt) The PM from time to time activates the Memory Compacting Manager 408 before setting the self-refresh mode.

Activation of the MCM results in a transition from non-secure to the secure execution domain. All the CPU context of the non-secure domain is preserved by the Trustzone HW. The cache and translation look-aside buffer (TLB) should be "flashed" before activating the MCM. By flashing the data cache, all dirty lines are written to the memory before the MCM performs the compacting.

Figure 8:
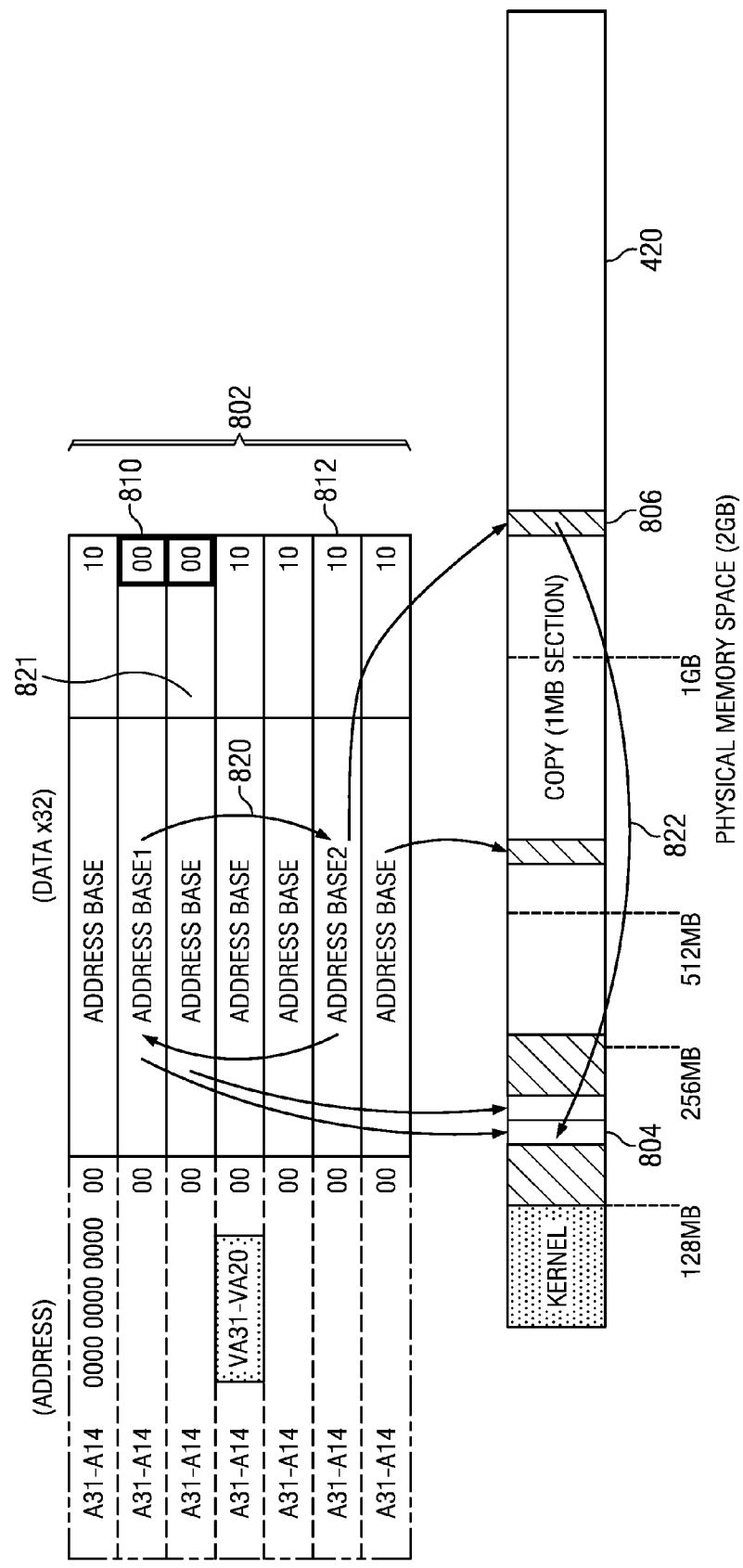
FIG. 8 is a schematic diagram illustrating operation of a memory compacting manger with a smart DMA in the device of FIG. 6.
Figure 9:
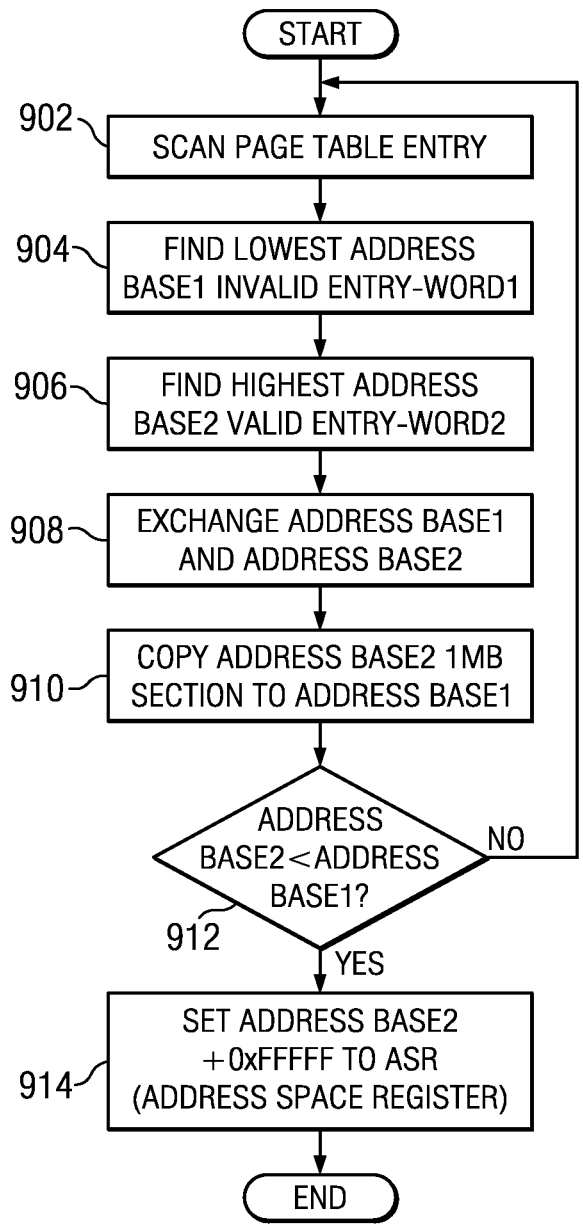
FIG. 9 is a flow diagram illustrating operation of the memory compacting manager.

FIG. 8 is a schematic diagram illustrating in more detail operation of a memory compacting manger with a smart DMA in the device of FIG. 6. FIG. 9 is a flow diagram illustrating operation of the memory compacting manager. MCM 408 first accesses the page table located in the physical memory. The starting address of the page table is defined by the bits (31-14) of TTB_0 register, referring again to FIG. 1.

FIG. 8 indicates a graphical view of the page table configured for 1 MB sections. The figure illustrates the 1 MB section translation, as was described with reference to FIG. 2. It should be noted that while only a few descriptors are illustrated in FIG. 8, the complete translation table may contain 4096 entries, as described earlier. When page translation is enabled, the MCM accesses the page table in two steps to fetch the second level descriptor, as was described with reference to FIG. 3.

To avoid the multiple accesses to the same page entry, the table can be buffered 602 to the on-chip SRAM 420.

If the kernel space is located at the lower address of the physical space, The MCM works on the page table to concentrate the valid entry to the lower address space. Likewise, if the kernel space is located at the upper address, it moves the valid entry to the upper space. The following is an example of the MCM operation.

The MCM scans 902 the first level descriptors 802 and stores 904 the lowest address base (bit 31-20) having the invalid entry (bit 1-0="00") which in this example is address base 810 pointing to 1 mb segment 804. The currently lowest address base is referred to as "address base1". The MCM also scans 906 for the highest address base having a valid entry (bit 1-0="10") which in this example is address base 812 pointing to segment 806. The currently highest base address is referred to as "address base2". It then exchanges 908 these two address bases as indicated at 810, 811. By this operation, a valid VA page that was stored in the higher PA space is re-allocated to a lower PA space where previously the invalid page was stored. The MCM then programs the smart DMA to copy 910 the 1 MB section 806 starting from "page address base2" to the 1 MB section 804 starting from "page address base1" as indicated at 812. The MCM continues the operation until (page address base1)>(page address base2) is detected 912. At the end of this operation, all the valid entries are located in the lower address space, and higher space is occupied by the invalid page entries.

This mechanism may be used to move pages/sections toward other memory locations, for example the target could be to move all pages to the high physical memory addresses so as to leave a "hole" in the physical RAM where PASR can be used to shut down unused RAM banks corresponding to this "hole".

0xFFFFFF is added to the "page address base2" and stored 914 to the Address Space Register (ASR) 660, referring to FIG. 6. ASR 660 now indicates the maximum address that is valid and that needs to be refreshed by the PASR.

The MCM operation is now completed, and execution is returned to the non-secure execution domain.

The CPU resumes the execution of the operating system. The power management (PM) routine 660 sets the DRAM into the self refresh mode, unless the OS is interrupted by events. Before the PM sets the DRAM into self refresh mode, it verifies the ASR value and determines which banks need to be refreshed. For example, if ASR indicates >0x6000 000, it sets MR2 "000" that means full banks are refreshed. If ASR indicates the smaller number, PM set MR2 register so that only the banks used by valid pages are refreshed.

Figure 10:
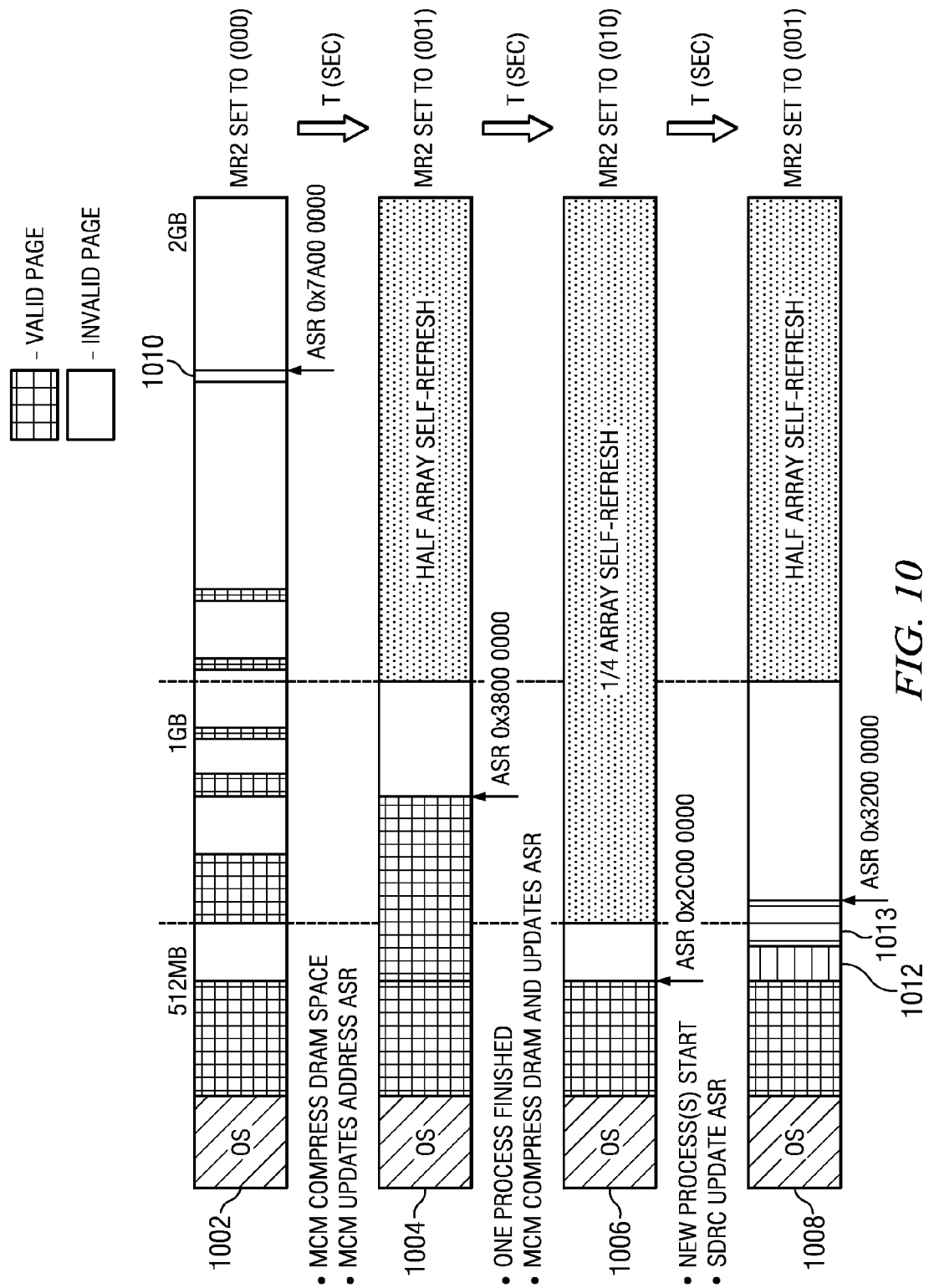
FIG. 10 is a flow diagram illustrating operation of the memory compacting manager of FIG. 9 over a series of exemplary events.

FIG. 10 is a flow diagram illustrating operation of the memory compacting manager of FIG. 9 over a series of exemplary events. A 2 GB memory system is represented at 1002. An OS is located in the lowest memory and various application are scattered in valid pages throughout the physical address range of the memory system.

While the OS is awake and executing applications by accessing physical space, address decoder 664, referring again to FIG. 6, monitors the accesses. If a higher address than the current ASR value is detected, the ASR should be updated. Every time the OS goes to idle, the latest ASR value is used to determine the PASR setting. In this example, the ASR is currently set to address 0x7A00 0000, to indicate segment 1010 is the highest valid memory segment. At this point, the self refresh bits of the mode register (MR2) are set to "000" indicate the entire memory needs to be refreshed, according to Table 1.

When the OS is ready to go idle, the MCM operation is performed, as described above. In this example at 1004, all valid pages have been compacted into the lower half of the 2 GB memory system and the ASR is set accordingly. Based on this ASR value, MR2 is set to 001 to indicate half array self-refresh, according to Table 1.

Later, a process may be finished and its now unneeded pages marked as invalid. After another MCM operation is performed, all valid pages may be further compacted as indicated at 1006. In this example, the ASR may be set to 0x2C00 0000 and MR2 set to 010 to indicate ¼ array self-refresh.

Later, a new process may be started and new memory is allocated as illustrated at 1012. Another process may be started and additional memory allocated as indicated at 1013, for example. At this point the ASR is updated to indicate 0x3200 0000 and MR2 is set to 001 to indicated ½ array self-refresh.

Figure 11:
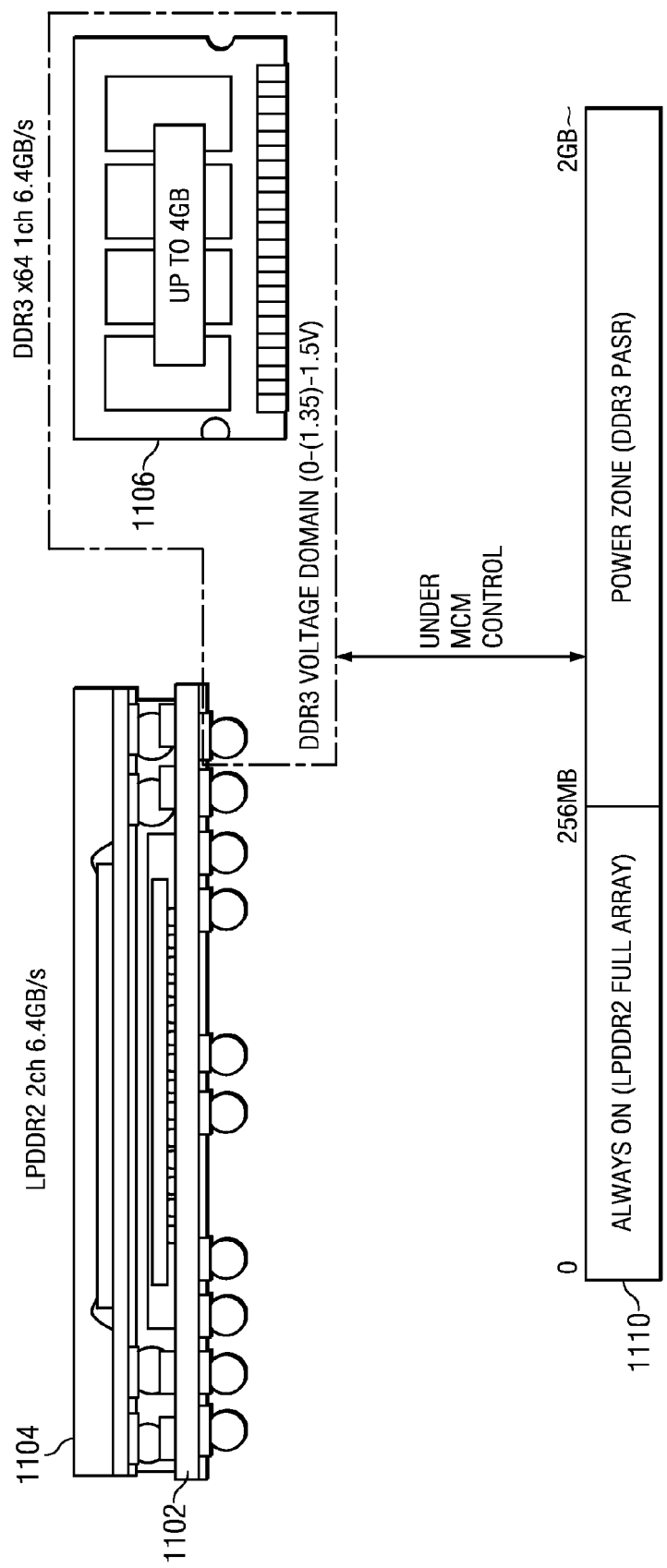
FIG. 11 is a pictorial diagram illustrating an embodiment of an exemplary packaging configuration for dynamically configured memory.

FIG. 11 is a pictorial diagram illustrating an embodiment of an exemplary packaging configuration for dynamically configured memory. In this embodiment, two memory systems are used, "high power memory system" 1106 and "low power memory system" 1104. The (2 GB) DDR3 memory module 1106 and the (256 MB) LPDDR2-POP memory 1104 are used for the system. In this configuration the power saving benefit is maximum since LPDDR 1104 is designed for low power self refresh. In this embodiment, LPDDR memory 1104 is coupled to processor module 1102 using stacked ball grid array packaging. DDR memory 1106 is coupled to processor module 1102 via tracks on another substrate (not shown). In this manner, the two memory systems provide a combined address space of slightly more than 2 GB, as illustrated at 1110.

The MCM may manage the combined memory space as described above. The power management process may be configured to keep the LPDDR always powered on, but to selectively turn off or invoke PASR according to the ASR results produced by the MCM. The 256 MB (this is just an example) of low power physical memory 1104 is considered enough for the low intensity applications, and to keep the system in idle; therefore, the DDR3 memory may be switched off most of the time.

The DDR3 memory may be turned on and initialized when the ASR value indicates higher than 256 MB. The CPU may be on halt during the initialization. The DDR3 memory may be switched off again when the MCM performs a compacting and ASR indicates a value lower than 256 MB. It is also possible to activate DDR3 PASR, when the DDR memory module is powered on in order to reduce power consumed by the DDR3 module is in partial use.

Hypervisor Operation

Another embodiment of the invention that incorporates a hypervisor and memory virtualization will now be described. A hypervisor, also called virtual machine monitor (VMM), allows one or more operating systems to run concurrently on a host computer—a feature called hardware virtualization. The hypervisor presents the guest operating systems with a virtual platform and monitors the execution of the guest operating systems. In that way, multiple operating systems, including multiple instances of the same operating system, can share hardware resources. Unlike multitasking, which also allows applications to share hardware resources, the virtual machine approach using a hypervisor isolates failures in one operating system from other operating systems sharing the hardware.

In this embodiment, a hypervisor provides a virtual machine for the operating system, and memory compacting is realized in the hypervisor domain. In this realization, the operating system is completely isolated and agnostic to the memory compacting. Therefore, this solution may be widely applicable to the multiple operating systems without modification to the kernel.

The Hypervisor is able to monitor the entire activity of the kernel to the CPU HW such as MMU, caches, and TLB. Therefore, it has entire visibility of the page table entries. Thus, it is possible to realize a very stable and robust embodiment of the invention using a Hypervisor.

Some CPUs, such as ARM-v7A architecture, provide specific HW assist for a hypervisor, including a second level MMU, which allows an easy embodiment of the invention without loosing CPU performance.

In an exemplary embodiment of the invention, memory compacting is processed using the second level MMU. Therefore, the first level MMU is not affected by the compacting. It is also possible to allocate pages to any physical address; therefore, physical memory does not need to be continuous.

Figure 12:
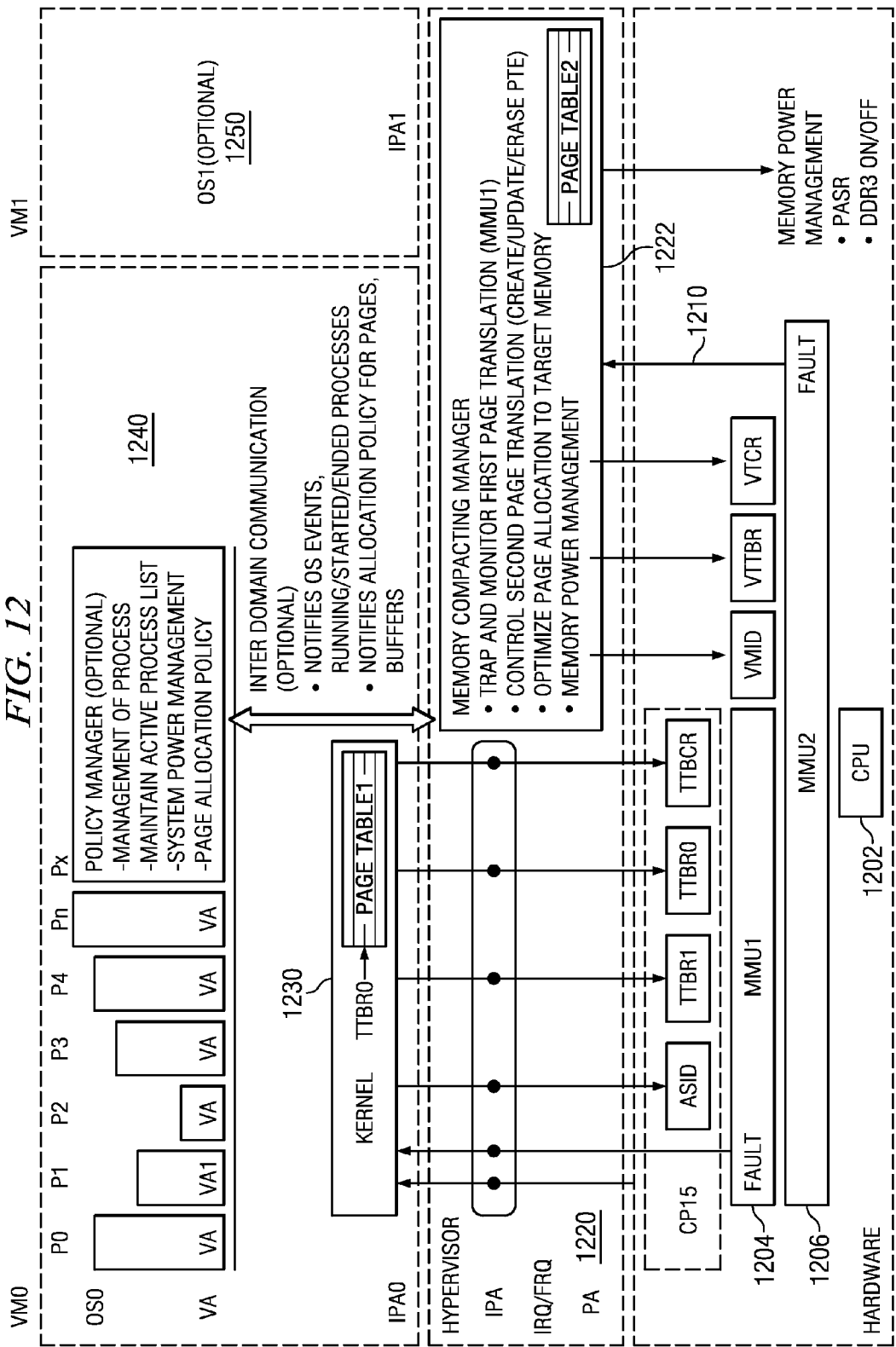
FIG. 12 is a schematic diagram illustrating an exemplary embodiment of a memory compacting manager in a computing device with a hypervisor.

FIG. 12 is a schematic diagram illustrating an exemplary embodiment of a memory compacting manager in a computing device with hypervisor. In the example of FIG. 12, an ARM-v7A CPU 1202 hardware assisted hypervisor will be described. However, other embodiments are not restricted to the ARM family of processors and may be based on other types of processors that provide appropriate hardware support for a Hypervisor environment. A kernel 1230 is responsible for providing a virtual memory system for its user space, therefore, the first level page translation (MMU1) 1204 is controlled by the kernel and user address space (virtual address) is translated into an Intermediate Physical Address (IPA). For operating system 1240 and the kernel 1230, IPA is the physical address of the virtual machine. However IPA is not used to access external memory. IPA is further translated by second level page translation by MMU2 1206 into the physical address. MMU2 and its page table entry is only controlled by Hypervisor 1220, and not known to the operating system.

It is also possible to include multiple operating systems on this platform, as indicated generally at 1250. In such a case, Hypervisor provides a virtual machine and IPA for each Operating system.

Any time kernel 1230 allocates new pages, there may be no valid page entries in the MMU2, which results in an MMU2 fault and therefore the hypervisor is called 1210. The hypervisor allocates physical address pages to enable the memory access.

On the other hand, when a process is terminated and its pages are invalidated, (freed for the new process), the hypervisor is acknowledged by the kernel access to the MMU1, and invalidates second page table entries too.

In this way, the hypervisor has full control of the memory usage of the operating system, and allocation of physical memory. Therefore, it is possible for MCM 1222 to operate in conjunction with hypervisor 1220 to reallocate the pages to minimize the memory usage and memory power consumption, as will now be described in more detail.

Figure 13:
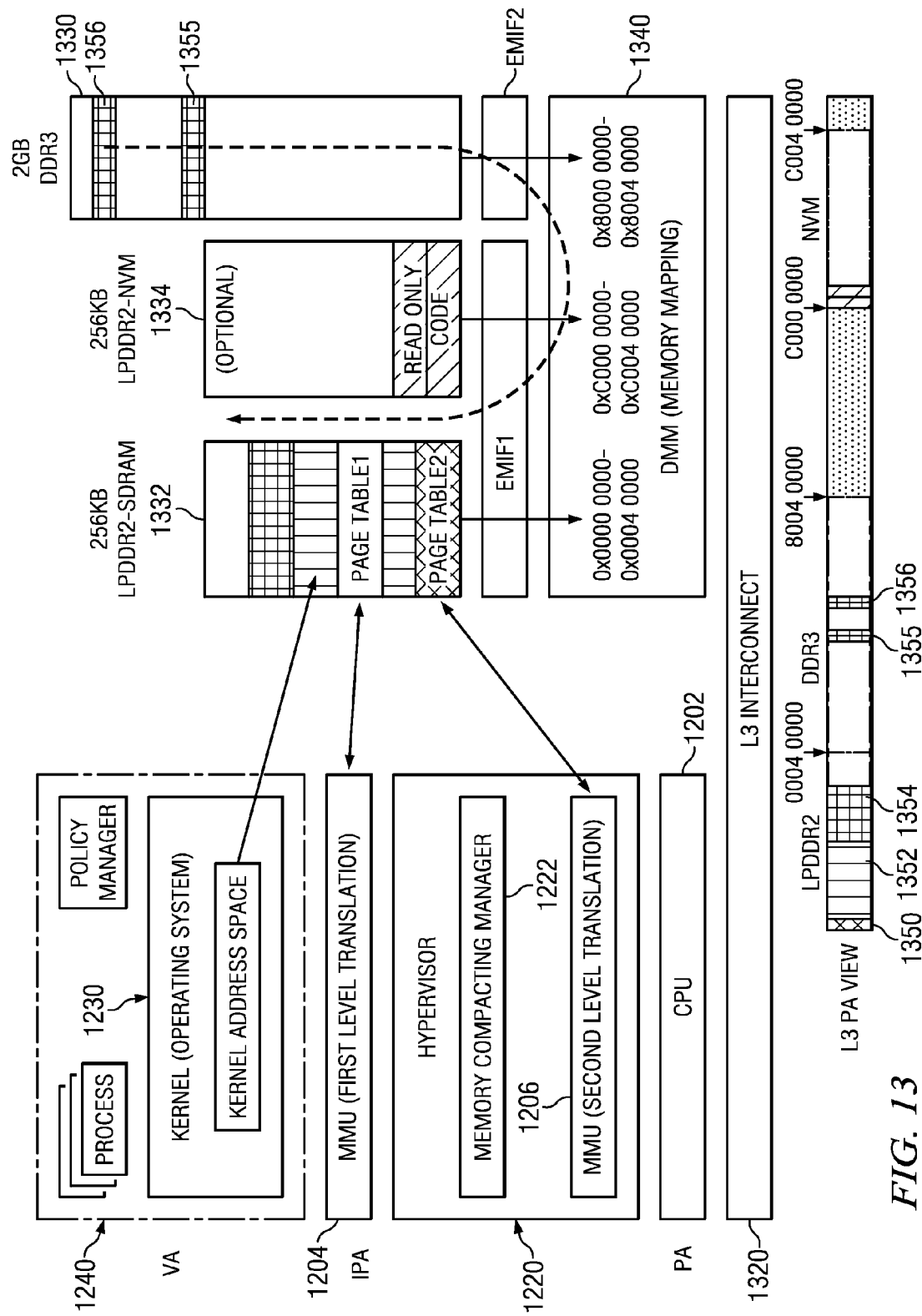
FIG. 13 is a block diagram illustrating the computing device of FIG. 12.

FIG. 13 is a block diagram illustrating a computing device with a memory compacting manager associated with the hypervisor. In the example of FIG. 13, two external memory interface controllers EMIF1, EMIF2 are integrated. They are connected to an L3 system bus 1320 by DMM module 1340. Dynamic memory management DMM module 1340 is programmable for mapping the external memory to the bus address (physical address). In this example LPDDR2-SDRAM 1332 coupled to EMIF1 is mapped from 0x0000 0000 to 0x0FFF FFFF (256 MB), DDR3-SDRAM 1330 coupled to EMIF2 is mapped from 0x2000 0000 to 0x8FFF FFFF (2 GB), and LPDDR2-NVM 1334 coupled to EMIF1 is mapped from 0xC000 0000 to 0xCFFF FFFF.

It is up to the hypervisor which memory to use. It is determined by the PA range of the second page table entry.

When the system is booted, hypervisor 1220 allocates the kernel address space into LPDDR2 1332 space in contiguous manner, but not overlapping with the hypervisor memory space. For simplicity, in this example, hypervisor space is located at lowest PA range 1350 and then kernel space is placed in range 1352. These are static allocation and will not be changed. When kernel request a page, the hypervisor create the page table entry of the MMU2 1206, and allocates the pages from the lower physical address.

First the LPDDR2 memory is used. Unless LPDDR2 becomes full, the hypervisor keeps DDR3 1330 in a power off state. When LPDDR2 1332 address space is filled and the new page is allocated to DDR3 1330, the hypervisor turns on DDR3, and initializes it before storing the page. Any time new pages are requested by the kernel, the hypervisor allocates a new page table entry.

If the user process is terminated and its pages are freed, the hypervisor invalidates the page table entry of MMU2 1206.

MCM 1222 in hypervisor 1220 is called periodically, and scans the page table entries to locate invalid pages in high memory and valid pages in low memory. FIG. 13 illustrates the memory usage after the several user processes are terminated. There are pages that are invalidated in the lower address range. In this case, the MCM 1222 moves the higher address page entries to a lower address, and copies the page to the new page location. For example, pages 1355, 1356 are copied to be contiguous with address range 1354.

By this operation, all valid pages in DDR3 1330 memory may be moved to LPDDR2 1332 memory. The pages in the DDR3 memory are all invalidated. These pages were already freed by the terminated process, and do not need to be kept. The hypervisor may now switch off the DDR3 memory until its address space is used next time.

The hypervisor may activate the partial array self-refresh if all valid pages can not be moved to low power memory 1332. By checking second page table 1206 entries, if valid pages can fit in the address range of particular memory banks, the hypervisor sets a mode register of the DDR3 memory so that only those memory banks are self refreshed, as was described in more detail earlier.

Figure 14:
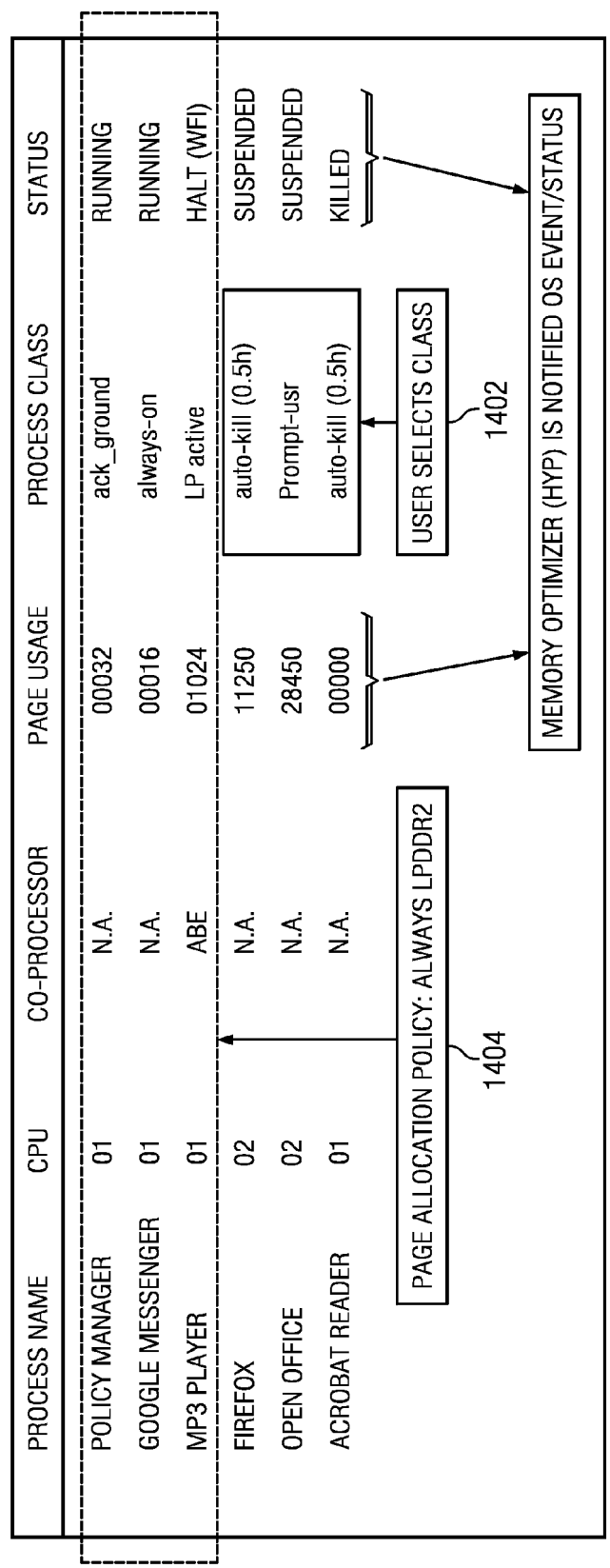
FIG. 14 is a flow diagram illustrating operation of a policy manger.

FIG. 14 is a flow diagram illustrating operation of a policy manger in the system of FIG. 13. The policy manager is one of the background processes of the operating system. It monitors the processes running in the operating system, such as process ID, its ASID (address space identifier) tags, page usage, and some properties. The policy manager has an inter-domain communication channel with the hypervisor, and informs the properties of the process and its event.

The hypervisor can use this information for memory compacting. Any time a process is terminated, the hypervisor is notified, and by comparing ASID and page size, it can invalidate the pages more efficiently.

The policy manager also perform 'house keeping' of the processes. The user may set 1402 "application classes" or "life cycles". For example, a user may set the web browser as "auto-kill" and "life cycle=30 min." If the browser is not used for 30 minutes, the policy manager automatically terminates the web browser and invalidates its pages.

It is also possible to convey 1404 page allocation policy to the hypervisor. For example, MP3 player app may be set as "low power application" and the hypervisor allocates the pages always in LPDDR2. If there is no space in the LPDDR2, the hypervisor moves other pages to the DDR3 and makes space for the MP3 player app. By locking an app such as the MP3 player in a fixed location, it may be easier for a digital signal processor (DSP) to share a buffer with such a process.

The LPDDR2-NVM is connected to chip select CS-1 of the EMIF1. The LPDDR2-NVM is a phase change memory. It is a random access memory having almost the same read performance as LPDDR2 but is non-volatile. It is slow to write (~10 MByte/s) but retains contents even when power is off.

The Hypervisor may allocate instruction pages, read only pages, and/or least recently modified pages to NVM. With this action, the hypervisor can create more free space. It is also possible to copy the entire LPDDR2-SDRAM 1332 contents to the LPDDR2-NVM 1334. System power can then be switched off, and the operating system will be resumed very quickly by copying back the contents to LPDDR2 SDRAM.

Figure 15A:
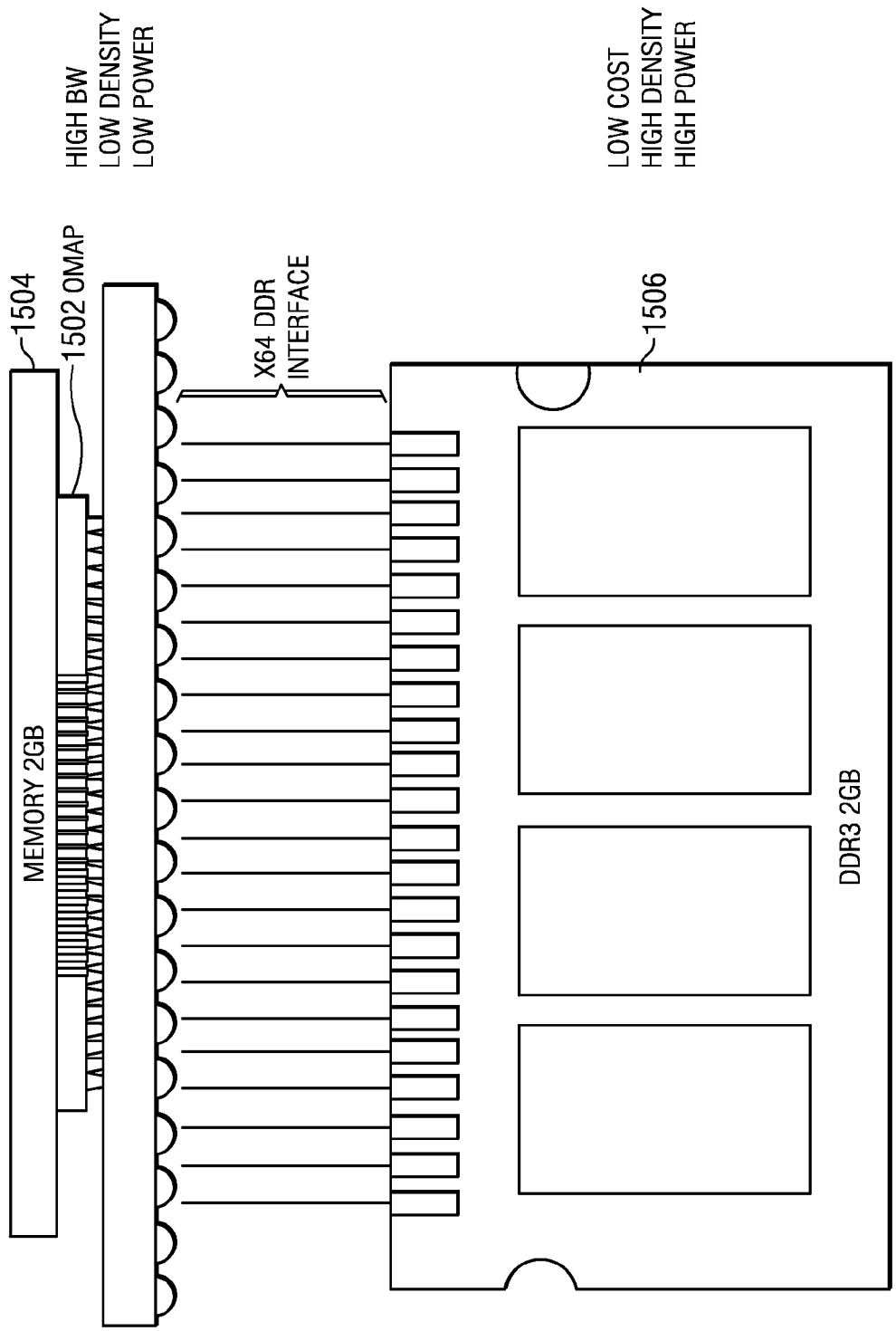
FIGS. 15A and 15B is a pictorial diagram illustrating another embodiment of an exemplary packaging configuration with wide I/O for a dynamically configured memory.

FIG. 15A is a pictorial diagram illustrating another embodiment of an exemplary packaging configuration 1500 with wide I/O for a dynamically configured memory. FIG. 15 illustrates a next generation processor 1502 with wide IO memory. The OMAP (open media application platform, available from Texas Instruments) processor has TSV (through silicon via) and Low power DDR 1504 is connected via TSV channel. With the TSV technology, it is possible to integrate thousands of interconnects between the dies. In this example, a 512 bit bus is used and 12.8 GByte/s data BW is achieved. Wide 10 memory is integrated in the same package with the OMAP die.

The Hypervisor may allocate kernel space and multimedia buffers into the wide BUS memory 1504. In this implementation, multimedia and kernel will be processed in very low power, and DDR3 1506 is only powered when a large application is loaded.

Figure 15B:
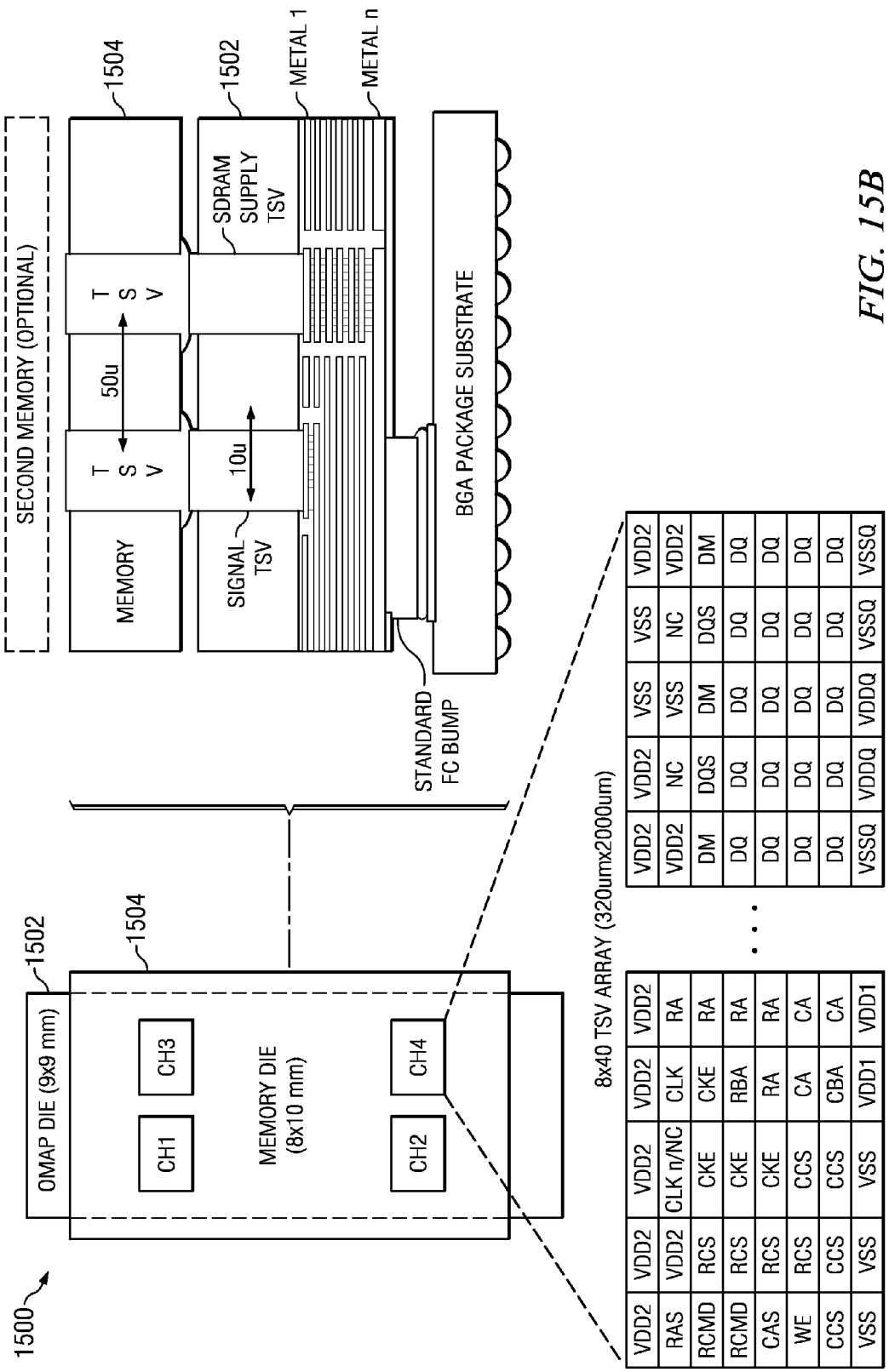

FIG. 15B is a more detailed pictorial diagram illustrating packaging configuration 1500 with wide I/O for a dynamically configured memory. Wide 10 memory 1504 has four channels CH1-DH4 that are each 128 bit. Each channel may be connected to a memory die to provide 200 MHz SDR, 4 Gb (512 MB) density, for example. As described above, by using a DMM module, this embedded memory may be mapped from 0x0000 0000 to 0x1FFF FFFF. The 2 GB external DDR3 memory 1506 is mapped from 0x2000 0000 to 9FFF FFFF. The Hypervisor and the kernel space should be mapped lower address space. Thanks to 128 bit bus, ARM cache line (256 bit) can be filled only by two clock cycles.

In this embodiment, each channel CH1-CH4 is configured as an 8×50 array of TSV. Each TSV data channel has less than 1 pF IO capacitance. This is only ⅕-⅛ of a LPDDR2 package; therefore execution of Hypervisor and kernel will be very efficient in this packaging embodiment, providing high performance and consuming low power.

512 MB address space is considered enough for many applications, e.g. audio and video player, e-mail and internet browser. In this case, external DDR3 1506 may be powered off unless a very memory demanding application is started.

System Example

Figure 16:
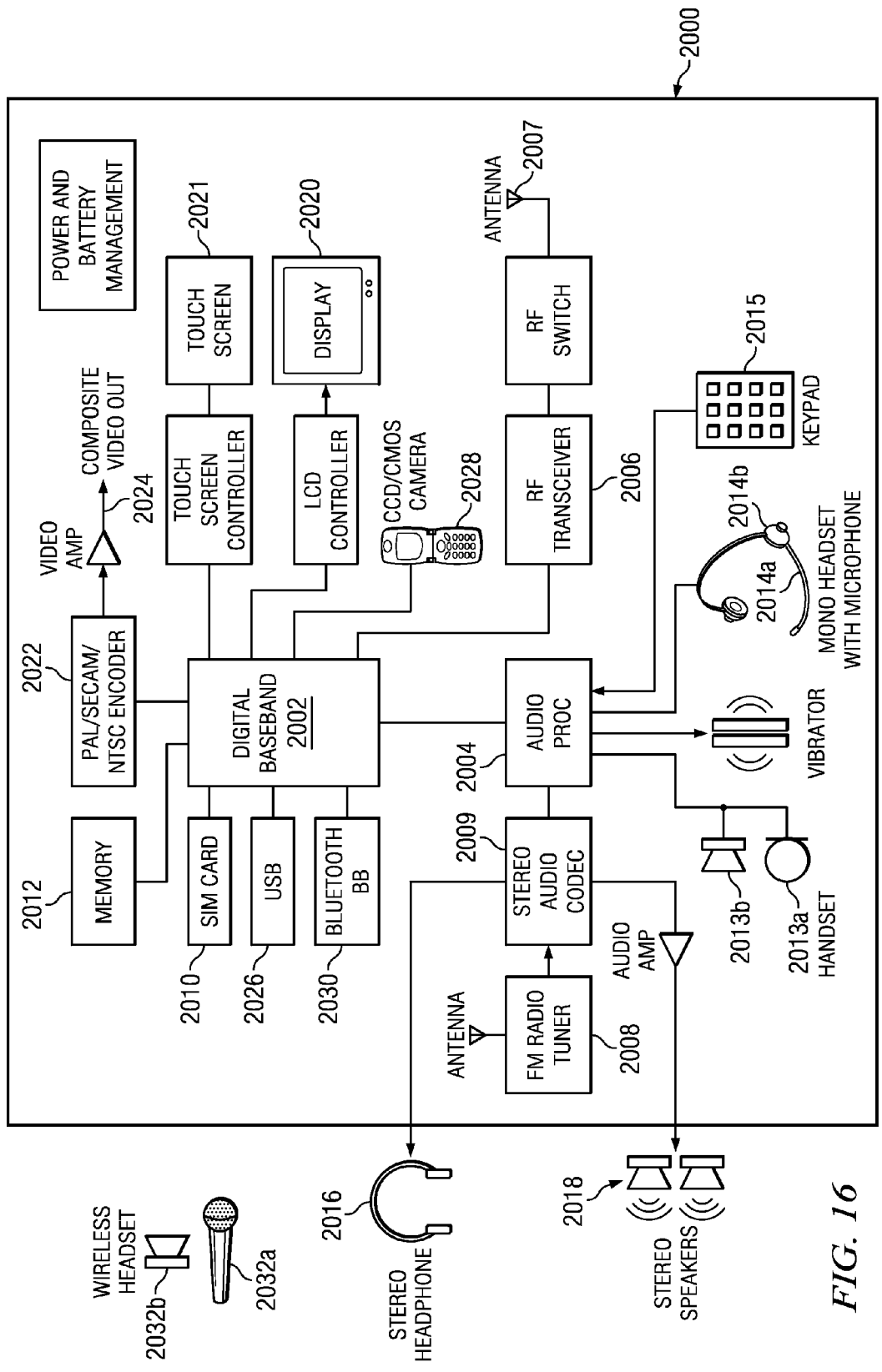
FIG. 16 is a block diagram of an exemplary mobile computing device that embodies a memory compacting manager.

FIG. 16 is a block diagram of mobile cellular phone 2000 for use in a cellular network. Digital baseband (DBB) 2002 includes an application processor such as an ARMv6 processor. It may also include cache memory and additional on-chip memory. DBB unit 2002 may also include a radio protocol processor that is a digital processing processor system (DSP) that includes embedded memory and security features. The DSP and ARM processor operate under two separate OSs. DBB 2002 may access memory 2012 that augments the on-chip memory and is used for various processing needs. DBB 2002 includes a memory management unit for performing virtual to physical address translation as described in more detail with reference to FIGS. 2 and 3. DBB 2002 also includes an embodiment of a memory compacting manager as described in more detail above. The memory compacting manager provides dynamic reconfiguration of paged memory 2012 by copying pages that are being used by the processor from a second region of the paged memory into a first region of the paged memory so that a portion of memory 2012 may be placed in a low power mode when it contains no pages that are being used by the processor.

In this embodiment, a hypervisor incorporates MCM and a real time OS (RTOS) for the radio protocol processor and Linux for the application processor. The memory area for RTOS should be fixed; there may be a separate memory (not shown) or it may be in a primary bank of memory 2012. Thus, the DBB may have two CPU cores sharing the same memory and have MCM applied to just the application CPU.

Audio Processing (AP) unit 2004 receives a voice data stream from handset microphone 2013a and sends a voice data stream to handset mono speaker 2013b. AP unit 2004 also receives a voice data stream from microphone 2014a and sends a voice data stream to mono headset 2014b. Usually, AP and DBB are separate ICs. In most embodiments, IOP performs processing based on configuration of audio paths, filters, gains, etc being setup by software running on the DBB. In an alternate embodiment, AP processing is performed on the same processor that performs DBB processing. In another embodiment, a separate DSP or other type of processor performs AP processing.

AP unit 2004 may also includes an analog to digital converter for converting an audio analog signal from microphone 2014a and 2013a to a digital signal that is then processed by DBB unit 1002 for transmission via RF transceiver 2006.

RF transceiver 2006 is a digital radio processor and includes a receiver for receiving a stream of coded data frames from a cellular base station via antenna 2007 and a transmitter for transmitting a stream of coded data frames to the cellular base station via antenna 2007. RF transceiver 2006 is connected to DBB 2002 which provides processing of the frames of encoded data being received and transmitted by cell phone 2000.

DBB unit 2002 may send or receive data to various devices connected to universal serial bus (USB) port 2026. DBB 2002 can be connected to subscriber identity module (SIM) card 2010 and stores and retrieves information used for making calls via the cellular system . . . DBB 2002 can be connected to Bluetooth baseband unit 2030 for wireless connection to a microphone 2032a and headset 2032b for sending and receiving voice data. DBB 2002 can also be connected to display 2020 and can send information to it for interaction with a user of the mobile UE 2000 during a call process. Display 2020 may also display pictures received from the network, from a local camera 2026, or from other sources such as USB 2026. DBB 2002 may also send a video stream to display 2020 that is received from various sources such as the cellular network via RF transceiver 2006 or camera 2026. DBB 2002 may also send a video stream to an external video display unit via encoder 2022 over composite output terminal 2024. Encoder unit 2022 can provide encoding according to PAL/SECAM/ NTSC video standards. In some embodiments, audio codec 2009 receives an audio stream from FM Radio tuner 2008 and sends an audio stream to stereo headset 2016 and/or stereo speakers 2018. In other embodiments, there may be other sources of an audio stream, such a compact disc (CD) player, a solid state memory module, etc.

Figure 17:
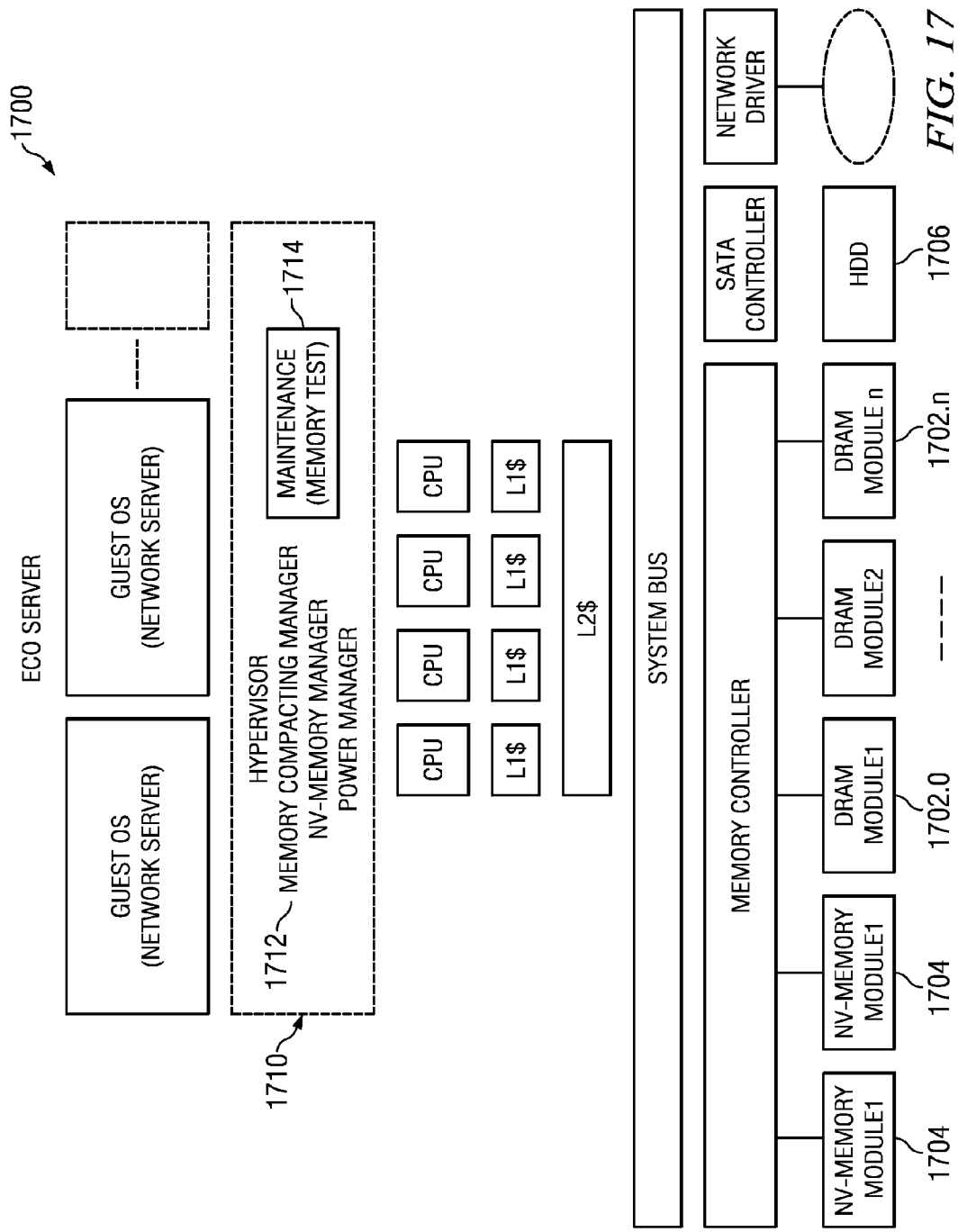
FIG. 17 is a block diagram of an exemplary server that embodies a memory compacting manager.

FIG. 17 is a block diagram of an exemplary ecologically sensitive server 1700 that embodies a memory compacting manager. In this application, multiple memory DRAM modules 1702.0-1702.n are connected, and are powered on/off according to usage. Least recently updated pages are moved to non-volatile memory modules 1704 or hard disk drive 1706 to make free space on the DRAM modules. A hypervisor 1710 may be used to provide virtual environments for the various guest OS that are executed on the multiple CPUs and level one cache (L1$) and level two cache (L2$). MCM 1712 is called periodically to compact memory allocated in the DRAM modules, as described in more detail above. After being compacted, the unneeded DRAM modules may be switched of or otherwise put into a low power mode. Self refresh power consumes a large portion of a network server power, therefore such embodiments of the MCM and power management may save a significant amount of power.

There is also a need to test and maintain the memory modules from time to time. To test memory, usually it is needed to shutdown the system. But in this embodiment, it is possible for the Hypervisor to free a range of address space of a target memory module using MCM 1712 and to run memory tests concurrently while the system continues normal processing. If a failure is detected, it is possible to exchange the memory module without system shutdown.

Other Embodiments

While embodiments of the invention have been described herein with respect to the ARM processor and Linux operating system, it is to be understood that embodiments of the invention are not restricted to the ARM family of processors or to the Linux OS and may be embodied using a variety of processors and operating systems in which memory mapping is used.

A memory compacting manager may be embodied as a separate module that operates outside of the operating system and requires no, or only a few, changes to the operating system. In another embodiment, a memory compacting manager may be embedded within an operating system and function as part of the operating system. In another embodiment, the memory compacting manager may be embodied as part of a hypervisor or in conjunction with a hypervisor that provides one or more virtual execution domains.

A memory compacting manager may be embodied in a simple virtualizer that is similar to a hypervisor but that provides mainly just the memory compaction function as described herein.

In some embodiments, a power management function may be part of the OS or a process that is managed by the OS. In another embodiment, a power management function may be added that is managed by the memory compaction manager.

Embodiments have been described herein with one or two levels of address translation. Other embodiments may include additional levels of address translation in which memory compacting is performed on only one or on several levels of translation.

In some embodiments, an application termination process may be embodied. Criteria for application termination is complex, it is a mix (weighted criteria) of;

application is not system but user, since it is usually unsafe to kill a system-level process;
application uses a lot of RAM;
application has been running a long time; and
application does not look very useful or "active" (e.g. does not receive user input, etc).

While embodiments of the invention are useful for battery powered mobile devices, other embodiments may be wall powered personal computers, servers or whole racks of processors. The power consumption of a data center may be significantly reduced by embodiments of the present invention.

Embodiments of dynamic configuration of memory by compacting described in this disclosure may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium such as compact disc (CD), a diskette, a tape, a file, memory, or any other computer readable storage device and loaded and executed in the processor. In some cases, the software may also be sold in a computer program product, which includes the computer-readable medium and packaging materials for the computer-readable medium. In some cases, the software instructions may be distributed via removable computer readable media (e.g. disk, optical disk, flash memory, USB key), via a transmission path from computer readable media on another digital system, etc.

Certain terms are used throughout the description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the preceding discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

Although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein.

It is therefore contemplated that the appended claims will cover any such modifications of the embodiments as fall within the true scope and spirit of the invention.

What is claimed is:

1. A method of operating a digital system comprising a processor coupled to a paged memory system, the method comprising:
executing by the processor at least one application program located in the paged memory system by copying program instructions from a non-volatile memory coupled to the processor into pages of the paged memory system under control of an operating system, wherein the paged memory system comprises at least two memory regions;
identifying pages in the paged memory system that are not being used by the processor; and
compacting the paged memory system by copying pages that are being used by the processor from a second region of the paged memory into a first region of the paged memory,
wherein when the first region is not large enough to hold all of the pages from the second region that are being used by the processor, swapping out the remaining pages from the second region to the non-volatile memory; whereby the second region can be placed in a low power mode, and
wherein a physical memory portion size of the digital system is adjusted as determined by an occurrence of at least one of:
a) the operating system is in idle or
b) only low intensity background applications are executed,
wherein said adjustment occurs without a reboot of said operating system as determined by the second region being placed in the low power mode.

2. The method of claim 1, further comprising placing the second region in a low power mode when it contains no pages that are being used by the processor.

3. The method of claim 1, wherein the paged memory system has a single level of virtual to physical address translation.

4. The method of claim 1, wherein the paged memory system has at least two levels of virtual to physical address translation, wherein compacting is not performed on a first level of translation.

5. The method of claim 4, further comprising:
managing the first level of translation by a kernel of the operating system; and
managing a second level of translation by a hypervisor that provides one or more virtual execution domains.

6. The method of claim 5, further comprising:
monitoring active processes being executed by the processor using a policy manager; and
managing the active processes in response to the policy manager to reduce the number of pages being used by the processor.

7. The method of claim 6, wherein the policy manager causes at least a portion of the processes to be stopped if not used for a specified period of time.

8. The method of claim 6, wherein the policy manager causes a portion of the process to remain active permanently.

9. The method of claim 1, wherein compacting is performed by a memory compacting algorithm that is isolated from the operating system and executed by the processor in a secure execution domain.

10. The method of claim 1, wherein compacting is performed by a memory compacting algorithm that is integrated into a kernel of the operating system.

11. The method of claim 1, wherein compacting the paged memory system comprises:
accessing and scanning page table entries of the paged memory system;
verifying a validity bit each scanned page table entry;
replacing a physical address base of a portion of page entries to form a continuous block of valid pages and a continuous block of invalid pages; and maintaining a boundary pointer indicative of a boundary between the block of valid pages and the block of invalid pages.

12. The method of claim 11, wherein the second region is placed in a low power mode in response to the boundary pointer.

13. The method of claim 1, wherein the first region is in a first memory device and the second region is in a second memory device, and the second region is placed in a low power mode by turning off the second memory device.

14. The method of claim 13, wherein the first memory device is an embedded wide-IO memory device and the second memory device is an external memory device.

15. The method of claim 1, wherein the first region is in a first memory bank and the second region is in a second memory bank, and the second region is placed in a low power mode by turning off refresh activity for the second memory bank.

16. The method of claim 2, further comprising placing the digital system in an idle mode, wherein compacting the paged memory system and placing the second region in the low power mode are performed while placing the digital system in the idle mode.

17. The method of claim 1, further comprising performing a memory test on the second region of the paged memory system while the processor continues to execute another application in the first region of the paged memory system.

18. A computing device, comprising:
a processor coupled to a paged memory management unit that is coupled to a paged memory system, wherein the processor is configured to execute at least one application program located in the paged memory system by copying program instructions from a non-volatile memory coupled to the processor into pages of the paged memory system under control of an operating system, wherein the paged memory system comprises at least two memory regions;
wherein the processor is configured to execute a process that is configured to identify pages in the paged memory system that are not being used by the processor, and to compact the paged memory system by copying pages that are being used by the processor from a second region of the paged memory into a first region of the paged memory; and
a power management module coupled to the processor that is configured to place the second region in a low power mode when it contains no pages that are being used by the processor,
wherein when the first region is not large enough to hold all of the pages from the second region that are being used by the processor, swapping out the remaining pages from the second region to the non-volatile memory; whereby the second region can be placed in the low power mode, and
wherein a physical memory portion size of the digital system is adjusted as determined by an occurrence of at least one of:
a) the operating system is in idle or
b) only low intensity background applications are executed,
wherein said adjustment occurs without a reboot of said operating system as determined by the second region being placed in the low power mode.

19. The computing device of claim 18, wherein a first level of translation is managed by a kernel of the operating system and a second level of translation is managed by a hypervisor that provides one or more virtual execution domains.

20. A method of operating a digital system comprising a processor coupled to a paged memory system, the method comprising:
executing by the processor at least one application program located in the paged memory system by copying program instructions from a non-volatile memory coupled to the processor into pages of the paged memory system under control of an operating system, wherein the paged memory system comprises at least two memory regions;
identifying pages in the paged memory system that are not being used by the processor;
compacting the paged memory system by copying pages that are being used by the processor from a second region of the paged memory into a first region of the paged memory,
wherein compacting is not performed on a first level of translation,
managing the first level of translation by a kernel of the operating system;
managing a second level of translation by a hypervisor that provides one or more virtual execution domains,
monitoring active processes being executed by the processor using a policy manager; and
managing the active processes in response to the policy manager to reduce the number of pages being used by the processor,
wherein when the first region is not large enough to hold all of the pages from the second region that are being used by the processor, swapping out the remaining pages from the second region to the non-volatile memory; whereby the second region can be placed in the low power mode, and
wherein a physical memory portion size of the digital system is adjusted as determined by an occurrence of at least one of:
a) the operating system is in idle or
b) only low intensity background applications are executed,
wherein said adjustment occurs without a reboot of said operating system as determined by the second region being placed in the low power mode, wherein the paged memory system has at least two levels of virtual to physical address translation.

21. The method of claim 20, wherein the first level of translation is managed by a kernel of the operating system and a second level of translation is managed by a hypervisor that provides one or more virtual execution domains.

* * * * *